United States Patent
Maeda et al.

(10) Patent No.: US 11,809,758 B2
(45) Date of Patent: Nov. 7, 2023

(54) INFORMATION PROCESSING APPARATUS, CONTROLLING METHOD FOR INFORMATION PROCESSING APPARATUS, AND COMPUTER PROGRAM FOR TRANSMITING QUALITY REQUEST DATA AND QUALITY REPORTS TO PRODUCE PRINT DATA THAT SATISFY QUALITY REQUIREMENTS OF USER

(71) Applicant: CANON KABUSHIKI KAISHA, Tokyo (JP)

(72) Inventors: Yuuki Maeda, Chiba (JP); Takaaki Yano, Tokyo (JP); Ryo Fujita, Tokyo (JP); Makoto Anno, Tokyo (JP); Hirotomo Tanaka, Chiba (JP); Shou Kikuchi, Chiba (JP); Kosuke Tsujita, Tokyo (JP); Hiroyuki Toriyabe, Chiba (JP); Satoshi Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/312,619

(22) PCT Filed: Dec. 18, 2019

(86) PCT No.: PCT/JP2019/049563
§ 371 (c)(1),
(2) Date: Jun. 10, 2021

(87) PCT Pub. No.: WO2020/130024
PCT Pub. Date: Jun. 25, 2020

(65) Prior Publication Data
US 2022/0019389 A1    Jan. 20, 2022

(30) Foreign Application Priority Data

Dec. 20, 2018   (JP) .................................. 2018-238210

(51) Int. Cl.
*G06F 3/12* (2006.01)

(52) U.S. Cl.
CPC .......... *G06F 3/1208* (2013.01); *G06F 3/1272* (2013.01); *G06F 3/1285* (2013.01); *G06F 3/1255* (2013.01)

(58) Field of Classification Search
USPC ................................................ 358/1.9, 1.15
See application file for complete search history.

(56) References Cited

U.S. PATENT DOCUMENTS

| 8,687,221 B1 | 4/2014 | Bergmans et al. |
| 8,724,192 B2 | 5/2014 | Sugiyama |

(Continued)

FOREIGN PATENT DOCUMENTS

| JP | 2003-127333 A | 5/2003 |
| JP | 2008-009863 A | 1/2008 |

(Continued)

OTHER PUBLICATIONS

ISO/AWI 20616-1, Graphic technology File format for quality control and metadata Part 1: Print requirements exchange (PRX), https://www.iso.org/standard/68565.html.

(Continued)

*Primary Examiner* — Haris Sabah
(74) *Attorney, Agent, or Firm* — VENABLE LLP

(57) ABSTRACT

An information processing apparatus includes at least one memory that stores instructions, and at least one processor that causes, by performing the instructions, the information processing apparatus to receive, via a network from an order-receiving system, received-order data including quality request data, interpret the received quality request data, generate a job including information used in quality adjustment to be performed by a production system, based on the interpretation result, and enter the job into the production (Continued)

system. The job including quality request data of a data format is generated, where the data format is different from a data format of the received quality request data and is according to the production system.

13 Claims, 18 Drawing Sheets

(56) References Cited

U.S. PATENT DOCUMENTS

| | | | |
|---|---|---|---|
| 8,994,972 B2 | 3/2015 | Matsumae et al. | |
| 10,042,592 B1 | 8/2018 | Soriano et al. | |
| 10,599,961 B2 | 3/2020 | Toriyabe et al. | |
| 11,636,294 B2* | 4/2023 | Shindo | G06K 15/002 358/1.9 |
| 2003/0035127 A1* | 2/2003 | Nakami | H04N 1/00432 358/1.9 |
| 2008/0049651 A1* | 2/2008 | Chang | G06F 3/1258 370/310 |
| 2009/0231620 A1* | 9/2009 | Kaneko | G06F 3/121 358/1.15 |
| 2010/0302597 A1 | 12/2010 | Sugiyama | |
| 2014/0002848 A1* | 1/2014 | Matsumae | G06F 3/1238 358/1.14 |
| 2014/0355017 A1* | 12/2014 | Sugita | H04N 1/6038 358/1.9 |
| 2015/0077786 A1* | 3/2015 | Tenda | G06F 3/121 358/1.14 |
| 2017/0315772 A1* | 11/2017 | Lee | G06F 3/1446 |
| 2018/0012113 A1* | 1/2018 | Toriyabe | G06F 3/1254 |
| 2019/0095147 A1* | 3/2019 | Yano | H04N 1/6044 |
| 2019/0260910 A1 | 8/2019 | Maeda | |
| 2020/0183627 A1 | 6/2020 | Toriyabe | |
| 2021/0294541 A1 | 9/2021 | Yano | |
| 2021/0294552 A1 | 9/2021 | Fujita et al. | |

FOREIGN PATENT DOCUMENTS

| | | |
|---|---|---|
| JP | 2009-223425 A | 10/2009 |
| JP | 2010-274569 A | 12/2010 |
| JP | 2014-010507 A | 1/2014 |
| JP | 2018-001704 A | 1/2018 |
| JP | 2020-095386 A | 6/2020 |

OTHER PUBLICATIONS

ISO/CD 20616-2, Graphic technology File format for quality control and metadata Part 2: Print quality exchange (PQX), https://www.iso.org/standard/69572.html.

Notification of Transmittal of the International Search Report and the Written Opinion dated Mar. 27, 2020, in International Application No. PCT/JP2019/049563.

Hiroyuki Toriyabe, U.S. Appl. No. 17/416,787, filed Jun. 21, 2021.

Shou Kikuchi, U.S. Appl. No. 17/395,824, filed Aug. 6, 2021.

Ryo Fujita, U.S. Appl. No. 17/178,478, filed Feb. 18, 2021.

Takaaki Yano, U.S. Appl. No. 17/177,347, filed Feb. 17, 2021.

Japanese Office Action dated Jan. 10, 2023, in related Japanese Patent Application No. 2018-238210.

Japanese Office Action dated Jun. 27, 2023, in related Japanese Patent Application No. 2018-238210.

* cited by examiner

FIG. 7

| Parameter SetType 701 | Name 702 | ID 703 | DATA NAME 704 | NUMBER OF PATCHES 705 | PATCH NUMBER 706 | CMYK_C 707 | CMYK_M 708 | CMYK_Y 709 | CMYK_K 710 | Lab_L 711 | Lab_a 712 | Lab_b 713 | DRAWING START POSITION_x 714 | DRAWING START POSITION_y 715 |
|---|---|---|---|---|---|---|---|---|---|---|---|---|---|---|
| Color | JapanColor | 1 | Control strip | 54 | 1 | 100 | 0 | 0 | 0 | 54 | -36 | -52 | 10 | 10 |
| | | | | | 2 | 70 | 0 | 0 | 0 | 67 | -24 | -37 | 10 | 20 |
| | | | | | 3 | 40 | 0 | 0 | 0 | 79 | -13 | -21 | 10 | 30 |
| | | | | | : | | | | | | | | | |
| | | | | | 54 | 0 | 0 | 0 | 0 | 95 | 0.5 | -1 | 20 | 270 |
| Color | GRAcoL | 2 | Control Wedge | 84 | A1 | 100 | 0 | 0 | 0 | 55 | -38 | -50 | 10 | 10 |
| | | | | | A2 | 75 | 0 | 0 | 0 | 65 | -28 | -40 | 10 | 20 |
| | | | | | : | | | | | | | | | |
| | | | | | C28 | 0 | 0 | 100 | 80 | 33 | -5 | 32 | 20 | 280 |
| Registration | Registration | 40 | FRONT/BACK REGISTRATION ADJUSTMENT DATA | 4 | 1 | 0 | 0 | 0 | 100 | . | . | . | (PAPER SIZE X)-10 | 10 |
| | | | | | 2 | 0 | 0 | 0 | 100 | . | . | . | (PAPER SIZE X)-20 | 10 |
| | | | | | 3 | 0 | 0 | 0 | 100 | . | . | . | 10 | (PAPER SIZE Y)-20 |
| | | | | | 4 | 0 | 0 | 0 | 100 | . | . | . | (PAPER SIZE X)-20 | (PAPER SIZE Y)-20 |
| Defects | Defects | 50 | IMAGE DEFECT CONFIRMATION | 1 | 1 | | | | | | | | 10 | (PAPER SIZE Y)-10 |
| Barcode | Barcode | 60 | BAR CODE CONFIRMATION | 1 | 1 | | | | | | | | (PAPER SIZE X)-10 | (PAPER SIZE Y)-10 |

FIG. 8

| JOB NUMBER | PRODUCT TYPE | BOOKBINDING TYPE | PAPER TYPE | FINISH SIZE | PAPER SIZE | POST-PROCESS | PRINT DATA STORAGE LOCATION | QUALITY REQUEST | | | QR DATA | BAR CODE NUMBER | PREPRESS DATA STORAGE LOCATION |
|---|---|---|---|---|---|---|---|---|---|---|---|---|---|
| 801 | 802 | 803 | 804 | 805 | 806 | 807 | 808 | 809 | | | 810 | 811 | 812 |
| 1 | PHOTO BOOK | PERFECT BINDING | GLOSSY PAPER | A5 | B4 | CUTTING | Photobook.pdf | Color1 | Defects50 | Barcode60 | Photobook.pdf | a10001a | ColorTrip.pdf |
| 2 | NAME CARD | NONE | HIGH-QUALITY PAPER | NAME CARD | A4 | CUTTING | Meishi.pdf | Registration40 | | | | a10002a | Registration.pdf |

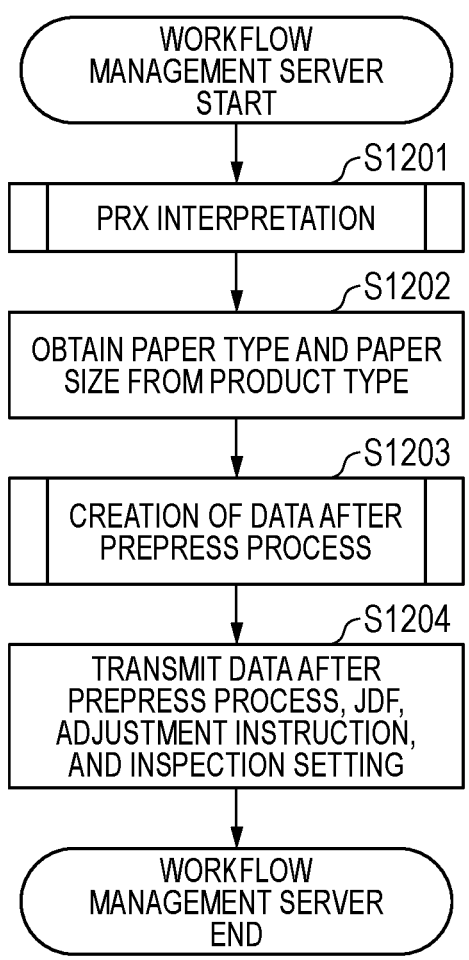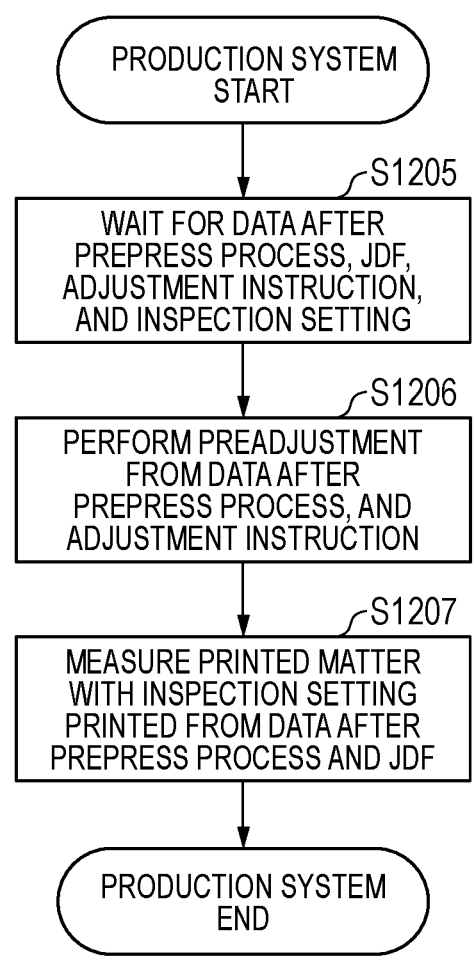

FIG. 16

- PrintRequirementsMessage
  - MessageInfo
  - BusinessInfo
  - QualitySpec
    - QualitySpecName/QualitySpecVersion
    - *Specifier
    - CustomerJobType/CustomerItemId
    - BasisOfCalculation
      - WeightedPercentage
      - Formula
    - OverallGradingScale
      - Grade
      - ZeroBaseline
    - MinimumAcceptableRank
    - *DesiredRank
    - QualityParameterSet
      - ParameterSetType/Name/Id
      - *WeightingFactor
      - ParameterSetScoringScale
      - MinimumAcceptableRank/*DesiredRank
      - *RequiredCompliance
  - *ReauiredSamplingPositons
  - *CxFReferenceData
  - *SamplingPositionImageData
  - *TagCollection/*CustomResources

FIG. 17

- PrintQualityMessage
    - MessageInfo
    - PrinterInfo
    - PressRunInfo
    - InkCollection
    - ReporterCollection
    - CustomerItemCollection
    - SampleCollection
        - RunPosition
        - SampleingTime/Duration/Frequency
        - MesurementSide
        - ColorReport
            - CustomerIdLink/PositionOnSample
            - ChartType/ChartId
            - Meaurement
        - RegistrationReport
            - CustomerIdLink/PositionOnSample
            - MarkType
            - VarianceReport
            - ChannelReport
        - DefectReport
        - BarcodeReport
    - CxFSampleData
    - CxFReferenceData
    - DefectImageData
    - TagCollection/CustomResources

INFORMATION PROCESSING APPARATUS, CONTROLLING METHOD FOR INFORMATION PROCESSING APPARATUS, AND COMPUTER PROGRAM FOR TRANSMITING QUALITY REQUEST DATA AND QUALITY REPORTS TO PRODUCE PRINT DATA THAT SATISFY QUALITY REQUIREMENTS OF USER

This application claims the benefit of Japanese Patent Application No. 2018-238210, filed Dec. 20, 2018, which is hereby incorporated by reference herein in its entirety.

TECHNICAL FIELD

The present invention relates to an information processing apparatus for managing quality of a printed deliverable, a controlling method for the information processing apparatus, and a program for the controlling method.

BACKGROUND ART

There are printing service forms called print on demand (POD), production printing, and commercial printing. In such service forms, a customer (also called an end user) who orders and requests printing and a printing company that provides a printed deliverable exist, and the customer orders a print product by providing the printing company with a specification of a printed deliverable to be ordered and, if necessary, image data to be used in printing. Here, the specification of the printed deliverable is elements for deciding the contents of the printed deliverable, such as a type of paper to be used, finish settings such as bookbinding and stapling, the number of prints, and the number of copies. The printing company creates the printed deliverable using the requested contents and the image data, and then delivers the created printed deliverable to the customer.

In such a commercial printing service, the printing company uses a variety of devices and software for performing everything from order reception to delivery of the printed deliverables. As constitutions for providing the commercial printing services, there are a printing apparatus for performing printing on paper, a finisher for performing bookbinding/stapling, an inspection apparatus for inspecting/checking the printed deliverables, and the like. Besides, in the commercial printing service, also a Web server for receiving orders for the printed deliverables from the customers, and a terminal and software for managing production of the printed deliverables are used. Besides, also a plurality of users of these devices and software exist. For example, there are a person in charge of order reception who manages an order-reception item and contacts with the customers, a process designer who designs work processes to complete the printed deliverables, an operator who operates the printing apparatus and the inspection apparatus, and a confirmer who performs quality confirmation of the final printed deliverables. There is also a printing company that has a plurality of production bases. In such a case, the printing company decides at which production base the printed deliverable is to be produced, based on the contents of the received order.

In the commercial printing service, a quality requirement of the printed deliverable is often specified by the customer to the printing company. Unlike the specification of the printed deliverable, the quality requirement is a requirement (or condition) related to quality of the printed deliverable, such as an amount of misregistration of images on the front and back sides of a paper, or a variation amount of color value of images between/among a plurality of copies or a plurality of pages. There are a wide variety of the printed deliverables including handouts such as flyers and brochures, photographic collections, books, name cards, display panels, and the like, and their uses and prices are various. Therefore, in terms of the quality requirements, there are a wide variety of requirements and levels demanded. As described later, in the printing company, since work processes for satisfying the quality requirements and a quality confirmation process for the printed deliverables are required, it is common that the higher a quality requirement level, the higher costs of the printed deliverable. The printing company creates the printed deliverables while performing various adjustment operations that satisfy these quality requirements. For example, based on a result of sample printing agreed with the customer, the printing company performs various adjustments to match the color of the printed deliverable to a specific color on a specific paper in the printing apparatus, and/or excludes as a defective product the printed deliverable that does not meet the quality requirement by an inspection after the printing. The printing company confirms whether or not the quality of the printed deliverable achieved by these operations has reached the quality requirement required by the customer, and submits a quality report to the customer as necessary.

In particular, in a case where orders for printed deliverables with various specifications and quality requirements are received from many customers, there are a wide variety of work to satisfy the customer's quality requirement for each printed deliverable, and thus it takes a long time. For example, it is assumed that the quality requirement related to a print misregistration between the front and back sides is demanded for a printed deliverable A, and that the quality requirement related to consistency with a color sample presented by the customer is demanded for a printed deliverable B. In this case, it is necessary for the person in charge of order reception to transmit the quality requirement for each printed deliverable to the process designer using a data format used by the printing company. Then, the process designer decides a work process for satisfying the quality requirement in production of each printed deliverable, based on types and states of the printing apparatus and software that are usable in the printing company. For example, the process designer decides adjustment work of a post-processing apparatus as for the printed deliverable A, and decides color calibration work of the printing apparatus as for the printed deliverable B. Further, for each work, the process designer decides result confirmation work such as color measurement work after the color calibration. Besides, the process designer decides a quality confirmation means indicating how to confirm that the produced printed deliverable satisfies the quality requirement, for example, the process designer decides a confirmation position of the print misregistration between the front and back sides, and the maximum value of an allowable misregistration amount. In general, since the printing company uses a plurality of printing apparatuses, the process designer needs to select, from among the plurality of printing apparatuses, the optimum apparatus to satisfy the quality requirement of the order-received printed deliverable. In this way, it is necessary for the printing company to define respective workflows for producing the printed deliverable satisfying the quality requirement and for confirming the quality of the produced printed deliverable. The operator receives the work process decided in this way, and operates the printing apparatus and software. The confirmer confirms that the printed deliverable satisfies the quality requirement based on the produced printed deliverable and the quality confirmation means. As just described, the printing company spends a lot of work man-hours to transmit the quality report that indicates the quality requirement, the work process for satisfying the quality requirement, and the confirmed quality of the printed deliverable.

Conventionally, when the customer and the printing company exchange the quality requirements and quality reports, a unified information format has not been defined and used. For this reason, the printing company receives quality requirements from a plurality of customers in different information formats respectively, whereby it has caused inconvenience when designing work processes for satisfying the quality requirements from the received quality requirements. Also, on the customer's side, when ordering printed deliverables to a plurality of printing companies, there has been complexity of exchanging quality requirements and quality reports in different information formats respectively.

Therefore, PRX and PQX described in NPL 1 and NPL 2 respectively are studied as means for unifying information formats for transmitting quality requirements and quality reports. The PRX is an abbreviation for a Print Requirements eXchange format, and represents a standard data format for a quality requirement required for printing. By using the PRX, quality requirements for different customers or different order reception can be described in a unified standard data format. The PQX is an abbreviation for a Print Quality eXchange format, and represents a standard data format for a print quality report. The PQX enables to transmit quality data of a printed deliverable in the standard data format. In this way, by using the PRX and the PQX, it becomes possible to transmit the quality requirements and the quality reports that have not been unified in the past, in the unified information format.

Moreover, there is a technique described in PTL 1 as a technique related to workflow construction related to order reception for a printed deliverable. PTL 1 describes the technique of constructing a workflow capable of producing order-receiving requirements for a printed deliverable by searching for processes from a database in which process definitions of individual processes constituting a workflow for satisfying the specification of the printed deliverable have been registered, and of combining the searched processes. At this time, in the technique of PTL 1, it is possible to present discount information to a customer by presenting workflows with different order-receiving requirements to the customer together with necessary costs. Thus, the customer can select a desired workflow from among a plurality of workflows respectively having different costs after comparing the specifications and the costs of these workflows.

CITATION LIST

Patent Literature

PTL 1: Japanese Patent Application Laid-Open No. 2008-009863

Non Patent Literature

NPL 1: ISO/AWI 20616-1, Graphic technology File format for quality control and metadata Part 1: Print requirements exchange (PRX), https://www.iso.org/standard/68565.html NPL 2: ISO/CD 20616-2, Graphic technology File format for quality control and metadata Part 2: Print quality exchange (PQX), https://www.iso.org/standard/69572.html

SUMMARY OF INVENTION

Technical Problem

Although the information formats for transmitting the quality requirements and quality reports have been proposed, how to apply these information formats to such a printing system as described in PTL 1 has not been studied in the past.

An object of the present invention is to provide a printing system that realizes greater efficiency in work processes by utilizing the information format for transmitting the quality requirements and quality reports, and thus automating work for producing printed deliverables that satisfy the quality requirements required by the customers.

Solution to Problem

An information processing apparatus according to the present is characterized by comprising: a receiving unit configured to receive received-order data including quality request data from an order-receiving system; an interpretation unit configured to interpret the received quality request data; a generating unit configured to generate a job including information used in quality adjustment to be performed by a production system, based on an interpretation result by the interpretation unit; and an entry unit configured to enter the job into the production system, wherein the generating unit is configured to generate the job including quality request data of a data format, here the data format is different from a data format of the received quality request data and is according to the production system.

Advantageous Effects of Invention

According to the above constitution, it is possible to automate work for producing a printed deliverable satisfying a quality requirement required by a customer and to realize greater efficiency of work processes.

BRIEF DESCRIPTION OF DRAWINGS

FIG. 7 is diagram for describing an example of a database in which measurement parameters of quality requests according to the embodiment have been recorded.

FIG. 8 is a diagram illustrating a job management table according to the embodiment.

FIG. 12A is a flow chart for describing an operation of a workflow management server according to the embodiment.

FIG. 12B is a flow chart for describing an operation of a production system according to the embodiment.

FIG. 16 is a schematic diagram of PRX.

FIG. 17 is a schematic diagram of PQX.

DESCRIPTION OF EMBODIMENTS

Figure 1:
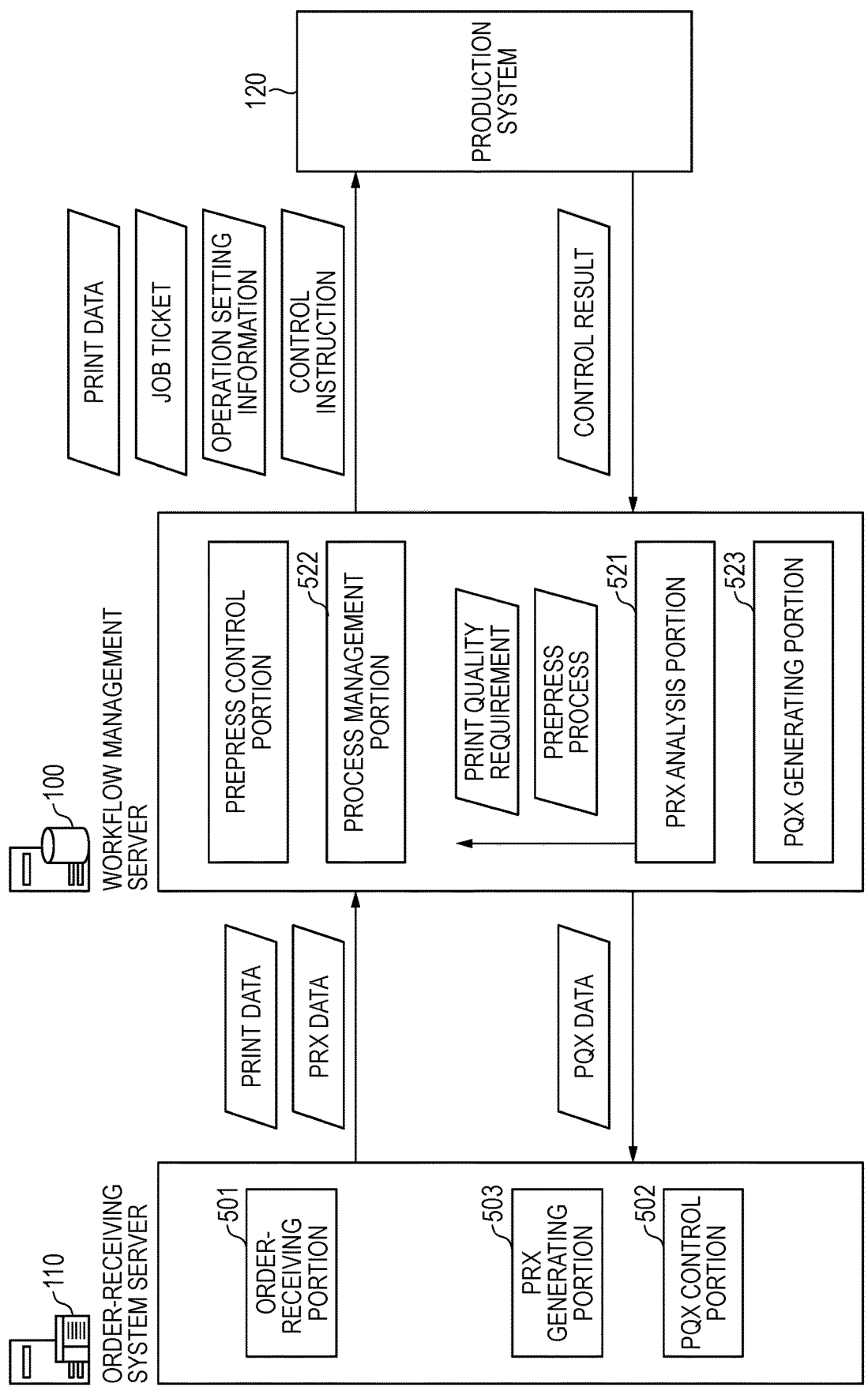
FIG. 1 is an overall schematic diagram according to Embodiment 1.

Hereinafter, embodiments of the present invention will be described in detail with reference to the accompanying drawings. It should be noted that the following embodiments do not limit the present invention according to the claims, and all the combinations of features described in the embodiments are not necessarily essential to the solutions of the present invention.

Embodiment 1

A quality requirement of a printed deliverable varies depending on a customer or the printed deliverable, and there can be many means for achieving such various quality requirements. For example, it is assumed that a customer demands, as the quality requirements, a high-level color reproducibility and stability for a corporate color used for a company logo. Here, the color reproducibility is a scale that indicates whether colors expressed by definitions such as RGB and CMYK in print data provided by the customer are printed in the same colors in the printed deliverable. Besides, the stability is a scale that indicates whether print data of the same color is printed in the color that does not change also in the printed deliverable, in printing of a plurality of pages or a plurality of copies. Since the corporate color is a color that symbolizes a company or organization, the customer often demands the high color reproducibility and stability, that is, the customer often demands as the quality requirements that printing is performed in the same color as that of the print data provided by the customer and that the print result does not change on any page. On the other hand, presence/absence of a printing apparatus and a work process for satisfying the quality requirement depend on the print data provided by the customer and the specification of the printed deliverable. In an example of the corporate color, a color value specified by the customer affects selection of the printing apparatus and ink to be used. Also, with respect to the color stability, color calibration of the printing apparatus and the frequency of confirmation of sample printing vary as work processes depending on a paper designated as the specification and the printing apparatus and ink to be used.

As just described, there are various work processes for satisfying the quality requirement required by the customer, depending on the specifications of the printed deliverable and the quality requirements required by the customer. By using a format of the above PRX, it is possible to input the quality requirement for the printed deliverable ordered from the customer, for each print job ordered in a digital format. Besides, by using the PQX, it is possible to describe a quality report for each print job in a digital format. Therefore, there is required a printing system that can, for each job, perform quality management for interpreting the PRX, adjusting a printing apparatus necessary for satisfying a quality request, and generating a sample print job necessary for confirming whether the quality requirement is satisfied.

In the present embodiment, a printing system for creating a printed deliverable that satisfies a quality requirement required by a customer and for creating a quality report of the printed deliverable is proposed. This printing system analyzes the quality requirement required by the customer, and develops a printing apparatus and a work process of software in a printing company. Also, this printing system develops a quality confirmation process for the produced printed deliverable. Further, this printing system automatically performs presetting of the printing apparatus and software. Thus, there is provided the printing system capable of reducing work man-hours for satisfying the quality requirements in the printing company, and of more easily deciding, transmitting and performing work processes.

In the present embodiment, the above PRX and PQX are used as the data formats of the quality requirement and quality report. By using such standard formats, it is possible to easily transmit the quality requirements and quality reports between a plurality of different customers or printing companies. It is also possible to compare quality requirements and quality reports of different printed deliverables.

In the present embodiment, an example will be described in which a workflow management server 100 interprets a print quality request described in a format of the PRX and performs print quality setting for a production system 120 according to the request content. The workflow management server 100 is an information processing apparatus that obtains received-order data from an order-receiving system server 110, interprets the obtained received-order data, and performs the print quality setting to the production system 120 based on an interpretation result. The received-order data includes quality request data in which a quality request is specified for each job.

FIG. 1 is an overall schematic diagram illustrating an overall image of the printing system according to the present embodiment. Details of the role of each device and apparatus and the operation of the printing system will be described with reference to FIG. 2 and subsequent drawings. In FIG. 1, items indicated by rhombus boxes represent data respectively. A feature of the present invention is that a PRX analysis portion 521 of the workflow management server 100 analyzes PRX data generated by the order-receiving system server 110, and transmits print data, a job ticket, operation setting information and a control instruction based on an analysis result to the production system 120.

Figure 2:
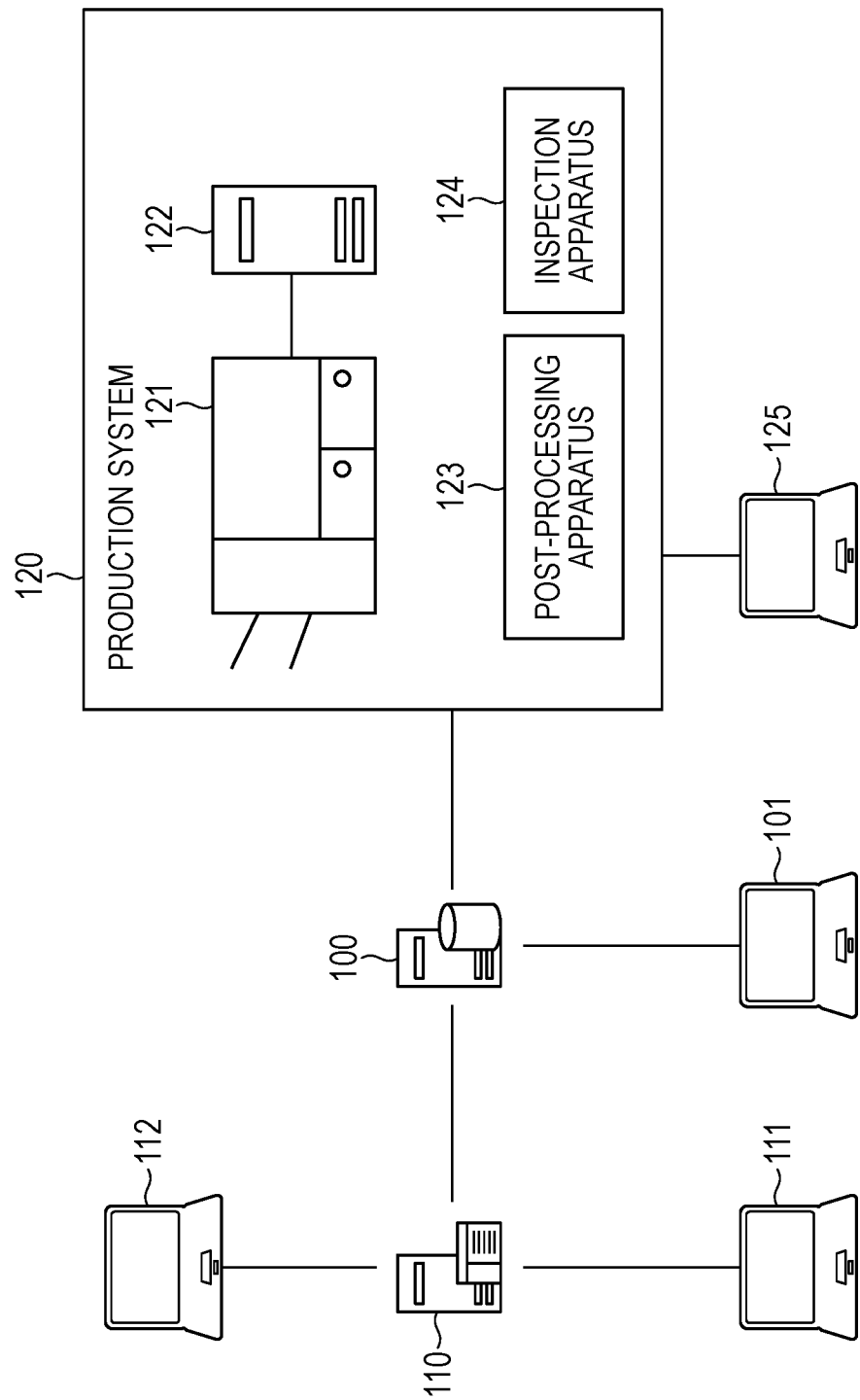
FIG. 2 is a conceptual diagram for describing an overall configuration of a system according to Embodiment 1.

FIG. 2 is a diagram for describing a configuration of a commercial printing system according to the present embodiment. The workflow management server 100 is an apparatus that manages an overall workflow for commercial print products.

The workflow management server 100 receives the received-order data (PRX data) including print data and quality requirement information from the order-receiving system server 110.

The workflow management server 100 interprets the PRX data received from the order-receiving system server 110, and performs decision of the production system 120, a prepress process of the print data, and the like for each order-receiving job. The workflow management server 100 according to the present embodiment generates the information used for quality adjustment for each job. The workflow management server 100 generates a job including quality request data of a data format interpretable by a printing apparatus 121 included in the production system 120.

Further, the data (the print data, the job ticket, the operation setting information, the control instruction illustrated in FIG. 1) to be processed in the production system 120 is generated and transmitted to each device (or apparatus) configuring the production system 120. The devices configuring the production system 120 will be described later. Furthermore, the PQX data is generated based on the information obtained from each device (the control result illustrated in FIG. 1), and the generated PQX data is transmitted to the order-receiving system server 110.

Incidentally, although in the present embodiment the workflow management server 100 is described as what is an on-premises server installed at a location where workflow management is performed, the present invention is not limited to this. As another embodiment, the workflow management server 100 may be constructed as a cloud server and connected to a later-described workflow management terminal 101 via the Internet. The same applies to the order-receiving system server 110 described later.

The workflow management terminal 101 is a terminal operated by a workflow administrator, and is connected to the workflow management server 100 via a network to perform various functions. More specifically, this terminal makes a setting change of workflow management function, confirms device statuses of the production system 120, and the like.

The order-receiving system server 110 is an apparatus that manages a system for receiving orders from end users in relation to commercial print products. This terminal generates and transmits the print data and PRX data to the workflow management server 100 according to the ordered product and the order content from the end user.

An order-receiving system management terminal 111 is a terminal operated by an order-receiving system administrator, and is connected to the order-receiving system server 110 via a network to perform various functions. More specifically, this terminal performs a function of setting required quality for each product, a function of checking a status for each order-receiving job, a function of viewing quality information of a deliverable for each order-receiving job, and the like.

An end user terminal 112 is a terminal operated by the end user, and is connected to the order-receiving system server 110 via a network. This terminal receives instructions for selection of a product, transmission of original document data, ordering and the like from the end user via a UI such as a web browser, and transmits the received instructions to the order-receiving system server 110.

The production system 120 is a system for producing commercial print products (deliverables) ordered from the end users. More specifically, this system is configured by the printing apparatus 121, a print server 122 that controls the printing apparatus 121, a post-processing apparatus 123, an inspection apparatus 124, and the like.

The printing apparatus 121 and the print server 122 are connected to each other by a network or a dedicated interface.

In the present embodiment, although the post-processing apparatus 123 and the inspection apparatus 124 will be described as having a near-line constitution connected to other devices or apparatuses via a network, the present invention is not limited to this. Namely, an off-line constitution in which each apparatus operates alone may be used. In case of the off-line constitution, the apparatus is connected to a not-illustrated operation terminal capable of being connected to the network, so that the apparatus is connected to the network via the operation terminal. In any case, the apparatus is connected to the workflow management server 100 via the network to transmit/receive various information.

Incidentally, the production system 120 may be configured not to comprise any or all of the print server 122, the post-processing apparatus 123 and the inspection apparatus 124.

The printing apparatus 121 is an apparatus that performs a printing process based on data and instructions from the workflow management server 100. A printing method is not particularly limited, and any of an electrophotographic method, an inkjet method and other methods may be used.

An administrator or operator of the production system 120 can instruct control related to printing via a UI of the printing apparatus 121.

The print server 122 is a server that controls the printing apparatus 121. Similar to a general printing system, the administrator or operator of the production system 120 can instruct control related to printing via a UI of the print server 122.

Incidentally, although in the present embodiment a later-described color management portion 545 is described as being included in the print server 122, the present invention is not limited to this. For example, it may be possible to separately install a color management server (not illustrated) capable of being connected to the print server 122 and the printing apparatus 121 via a network, and cause the color management server to perform a process related to color management.

The post-processing apparatus 123 is an apparatus for performing a post-process to a printed paper (sheet) or paper bundle (sheet bundle). For example, this apparatus performs creasing or folding of a paper, cutting of a paper bundle, a bookbinding process, or the like.

The inspection apparatus 124 is an apparatus that detects a deliverable not satisfying a quality request with respect to a final deliverable or intermediate deliverable, and performs a process such as notification to a user, exclusion from a production line or the like.

A production operator terminal 125 is an apparatus that is used by an operator who operates various devices and apparatuses of the production system 120. This terminal has functions such as a function of confirming a device operating status, a function of confirming error information at a time when an error occurs, and the like. As another form, instead of an external terminal, an UI operation part of each device may be constituted to bear these functions.

Besides, the production operator terminal 125 is a terminal that is operated by a production system administrator, and can be connected to the production system 120 via a network to monitor and manage a state of the production system.

Figure 3:
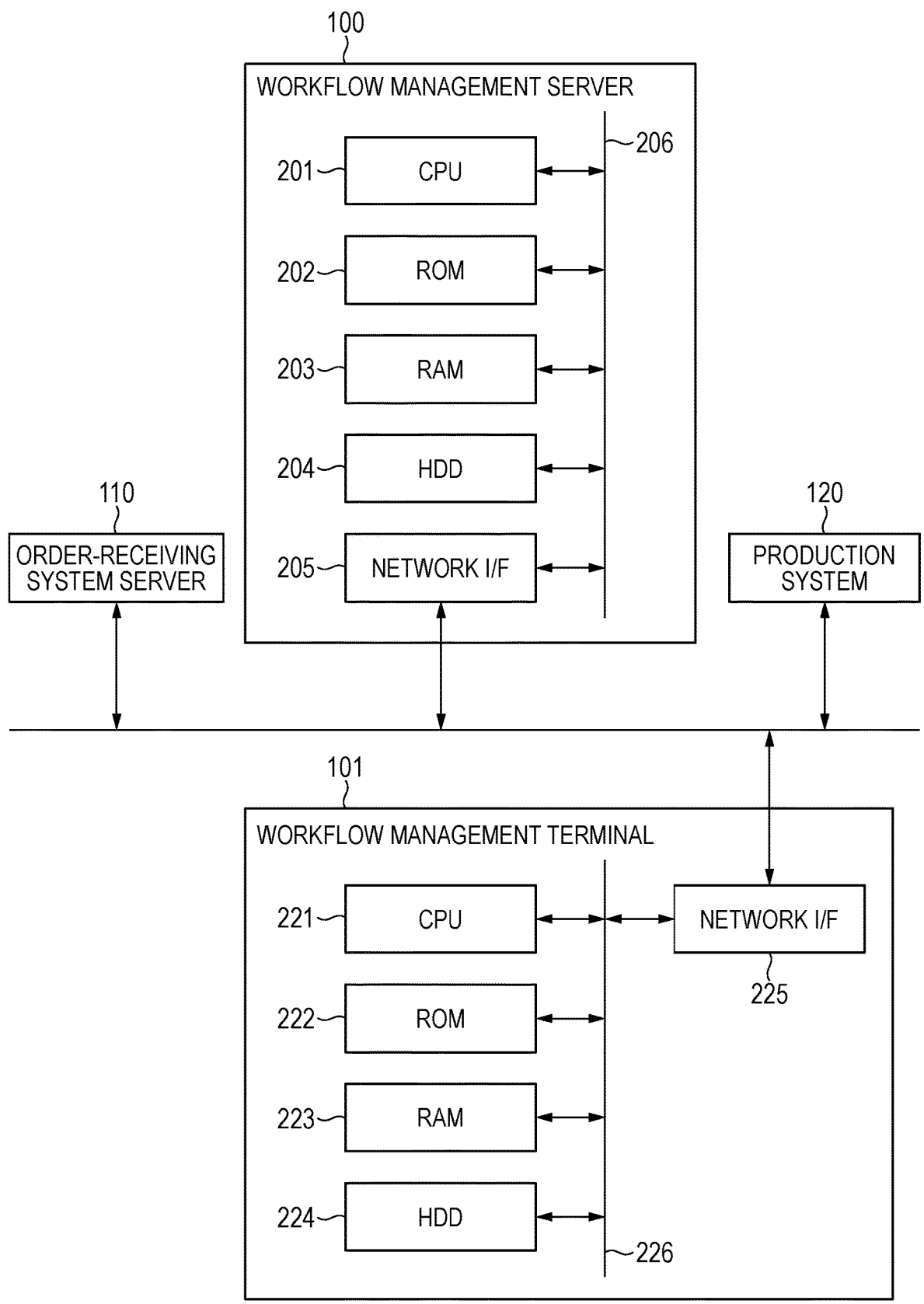
FIG. 3 is a block diagram for describing a hardware constitution of a workflow management system according to Embodiment 1.

Next, hardware constitutions of various apparatuses related to the present embodiment will be described. FIG. 3 is a block diagram illustrating the hardware constitution of a workflow management system including the workflow management server 100 and the workflow management terminal 101 according to the present embodiment.

First, the hardware constitution of the workflow management server 100 will be described. A CPU 201 expands a control program stored in a ROM 202 or a hard disk (HDD) 204 into a RAM 203, and executes the expanded program to comprehensively control access to various devices or apparatuses connected to a system bus 206. The ROM 202 stores a control program and the like executable by the CPU 201. The RAM 203 mainly functions as a main memory, a work area and the like of the CPU 201, and is constituted such that its memory capacity can be expanded by the option RAM 203 connected to a not-illustrated expansion port. The hard disk (HDD) 204 stores a boot program, various applications, font data, a user file, an edit file and the like. Although the HDD 204 is used in Embodiment 1, besides the HDD, an SD card, a flash memory or the like may be used as an external storage. The same applies to devices and apparatuses respectively having HDDs described below. A network interface (I/F) 205 performs data communication with various apparatuses via a network.

Incidentally, since also the hardware constitution of the order-receiving system server 110 is the same as that of the workflow management server 100, a description thereof is omitted.

Next, the hardware constitution of the workflow management terminal 101 will be described. A CPU 221 expands a control program stored in a ROM 222 or a hard disk (HDD) 224 into a RAM 223, and executes the expanded program to comprehensively control access to various devices or apparatuses connected to a system bus 226. The ROM 222 stores a control program and the like executable by the CPU 221. The RAM 223 mainly functions as a main memory, a work area and the like of the CPU 221, and is constituted such that its memory capacity can be expanded by the option RAM 223 connected to a not-illustrated expansion port. The hard disk (HDD) 224 stores a boot program, various applications, font data, a user file, an edit file and the like. A network I/F 225 performs data communication with other apparatuses via a network.

Incidentally, since the other terminal apparatuses such as the order-receiving system management terminal 111, the end user terminal 112, the production operator terminal and the like have the same hardware constitution as that of the workflow management terminal 101, a description thereof is omitted.

Figure 4:
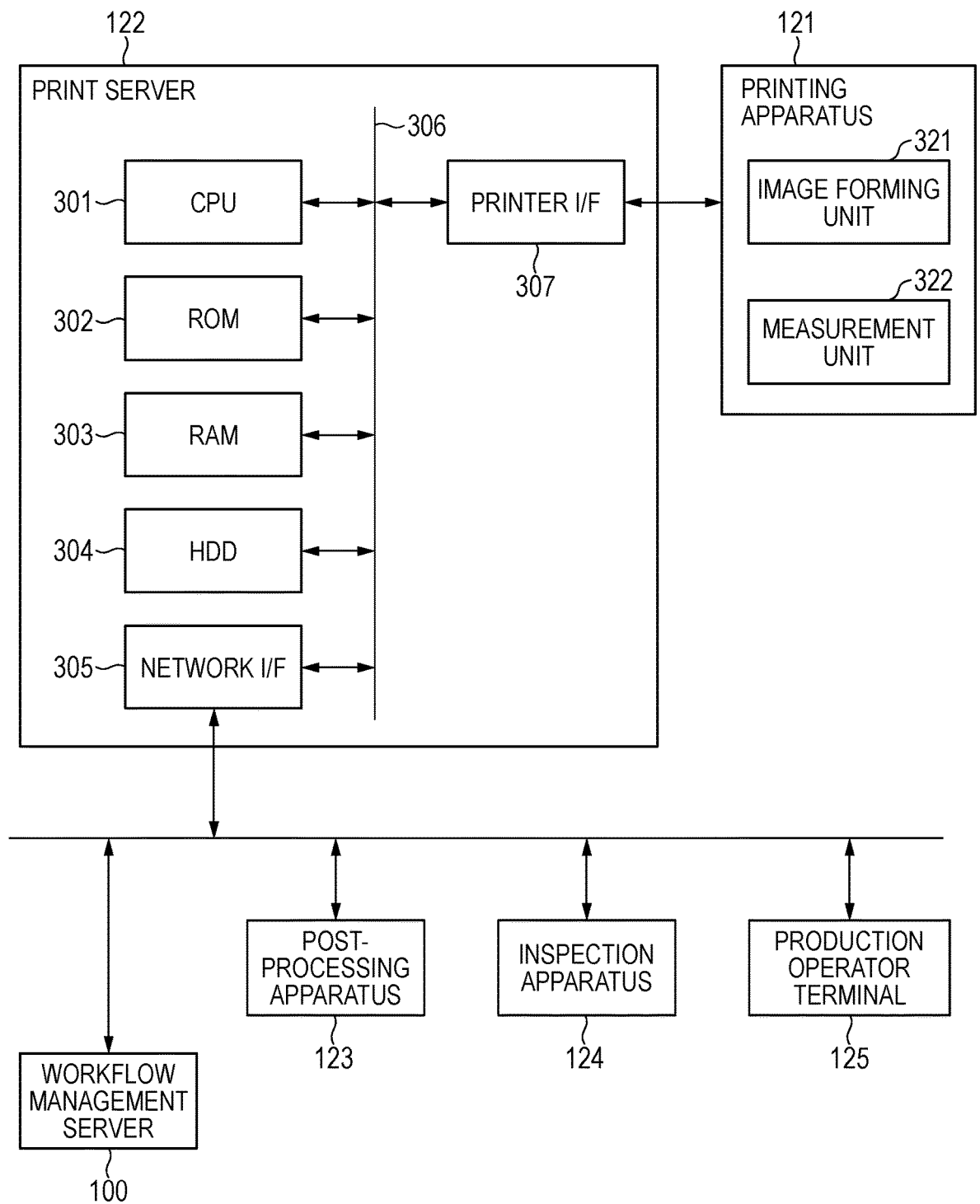
FIG. 4 is a block diagram for describing a hardware constitution of a production system according to Embodiment 1.

FIG. 4 is a block diagram for describing a hardware constitution of the production system 120 according to the present embodiment.

A CPU 301 expands a control program stored in a ROM 302 or a hard disk (HDD) 304 into a RAM 303, and executes the expanded program to comprehensively control access to various devices or apparatuses connected to a system bus 306. The ROM 302 stores a control program and the like executable by the CPU 301. The RAM 303 mainly functions as a main memory, a work area and the like of the CPU 301, and is constituted such that its memory capacity can be expanded by an option RAM connected to a not-illustrated expansion port. The hard disk (HDD) 304 stores a boot program, various applications, font data, a user file, an edit file and the like. A network I/F 305 performs data communication with other apparatuses via a network.

A printer I/F 307 controls image output to an image forming unit 321 of the printing apparatus 121. Besides, the printer I/F 307 controls a measurement unit 322 provided in the printing apparatus 121, and receives a measurement result.

The printing apparatus 121 comprises the image forming unit 321 responsible for at least a printing operation, and the measurement unit 322 described later. In addition, the apparatus may have a constitution in which a not-illustrated paper feeding apparatus and/or an inline post-processing apparatus are/is connected.

The image forming unit 321 outputs print data on a paper. The hardware constitution of this unit is the same as that of the general printing apparatus 121.

The measurement unit 322 measures a print product generated by the image forming unit 321 in accordance with an instruction from the print server 122 or the printing apparatus 121 itself. A measurement format is a known measurement format such as spectral color measurement, density measurement, CCS scanning, CIS scanning or the like.

Incidentally, although in the present embodiment the measurement unit 322 is described as being provided in the printing apparatus 121, the present invention is not limited to this.

Independent of the printing apparatus 121, the measurement unit 322 alone may be connected to a network. Otherwise, the measurement unit is connected to a not-illustrated operation terminal capable of being connected to a network so as to connect to the network via the operation terminal. In any case, the measurement unit is connected to the workflow management server 100 via the network to transmit/receive various information.

Next, software configurations of various devices and apparatuses according to the present embodiment will be described.

Figure 5A:
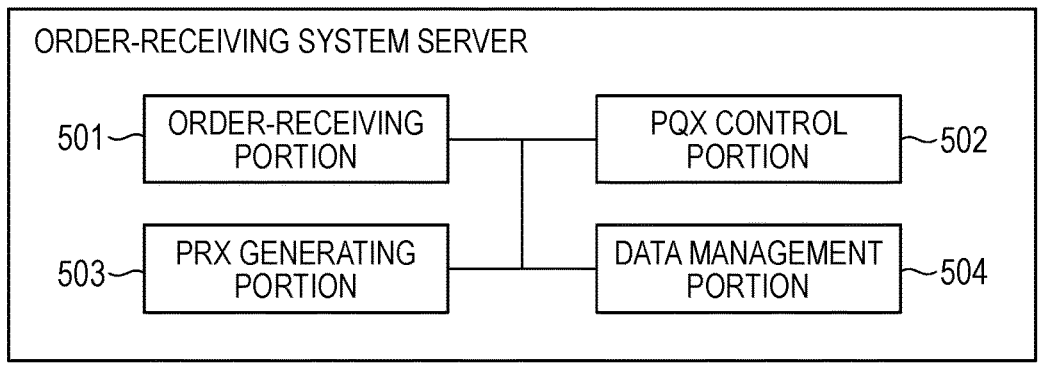
FIG. 5A is a block diagram for describing a software configuration according to Embodiment 1.

FIG. 5A is a block diagram for describing a software configuration of the order-receiving system server 110 according to the present embodiment. It should be noted that such software modules as illustrated are stored as programs in an HDD (not illustrated), and are realized by a CPU (not illustrated) expanding and executing these programs into a RAM (not illustrated).

An order-receiving portion 501 receives order information of a product from the end user terminal 112 via the network. The order information includes product type information, submitted image data, request information related to quality, and the like. Incidentally, although in the present embodiment PDF format data is described as an example of the submitted data, the present invention is not limited to this. It may be also possible to treat image data of another general format interpretable by the production system 120.

A PQX control portion 502 receives the PQX data from the workflow management server 100, and performs predetermined control. For example, this portion performs recording to a database, a conversion process to information to be presented to an end user, and the like.

A PRX generating portion 503 analyzes the order information received from the order-receiving portion 501, and generates the PRX data. Further, this portion transmits the generated PRX data to the workflow management server 100.

A data management portion 504 records information such as the order information, the PRX data, the PQX data and the like. Besides, the data management portion 504 transmits the submitted image data, the product type information and the PRX data to the workflow management server 100. Further, the data management portion 504 performs other data transmission/reception with various apparatuses.

Figure 5B:
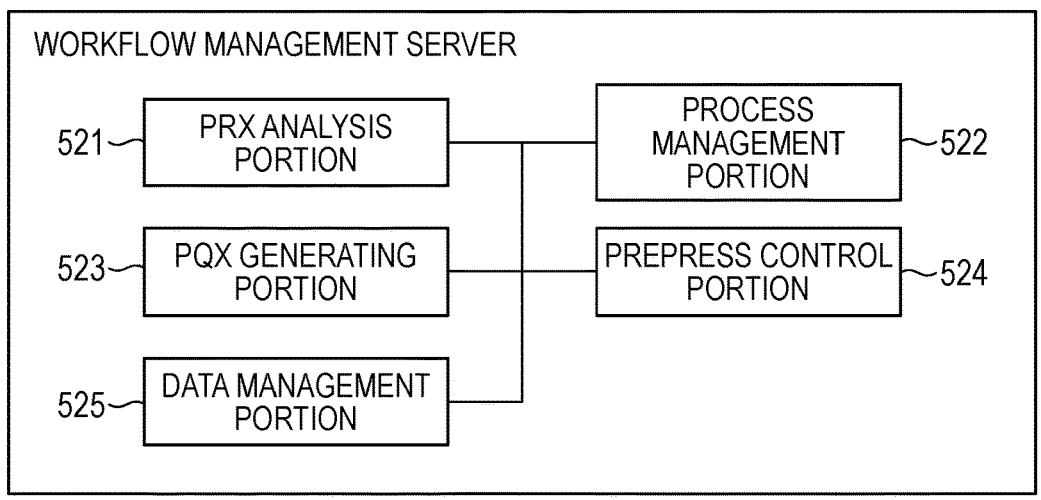
FIG. 5B is a block diagram for describing a software configuration according to Embodiment 1.

FIG. 5B is a block diagram for describing a software configuration of the workflow management server 100 according to the present embodiment. It should be noted that such software modules as illustrated are stored as programs in the HDD 204, and are realized by the CPU 201 expanding and executing these programs into the RAM 203.

The PRX analysis portion 521 analyzes the PRX data received from the order-receiving system server 110, and identifies a part of a print quality requirement and required prepress process. For example, the print quality requirement is that an average color difference obtained from a measurement result of a predetermined color patch is within a specific standard. Further, the prepress process is, for example, a process such as addition of the color patch image, which is a color measurement target in a color quality confirmation process, to a margin portion of image data.

A process management portion 522 uses the product type information received from the order-receiving system server 110 and analysis result information of the PRX analysis portion 521 to decide the production system 120 and execute a command to a prepress control portion 524. There is a case where, depending on the product type, the product is composed of a plurality of types of parts. In this case, it is necessary for the process management portion 522 to generate a job for each part from one order. The process management portion can be configured by a process management application that manages printing processes by the production system.

Besides, the process management portion 522 generates job ticket data referred to by each apparatus in the production system 120. In the present embodiment, although known JDF data is used as the job ticket data, the present invention is not limited to this. It may be also possible to adopt a configuration in which another known job ticket data format interpretable by the production system 120 is used.

Besides, the process management portion 522 generates operation setting information of the post-processing apparatus 123 and the inspection apparatus 124 by referring to information of the print quality requirement.

Further, the process management portion 522 transmits PDF data after the later-described prepress process, the JDF data, and the operation setting information of each apparatus to the production system 120.

A PQX generating portion 523 generates the PQX data by referring to various types of information received from the production system 120, and transmits the generated PQX data to the order-receiving system server 110. Details of such operations will be described later.

The prepress control portion 524 performs the prepress process to the submitted image data based on an instruction from the process management portion 522, and transmits the processed PDF data to the process management portion 522.

A data management portion 525 transmits the PQX data to the order-receiving system server 110. Besides, the data management portion 525 transmits the PDF data, the JDF data, and instruction information for various apparatuses configuring the production system 120 to the production system 120. Further, the data management portion 525 performs other data transmission/reception with various apparatuses.

Figure 5C:
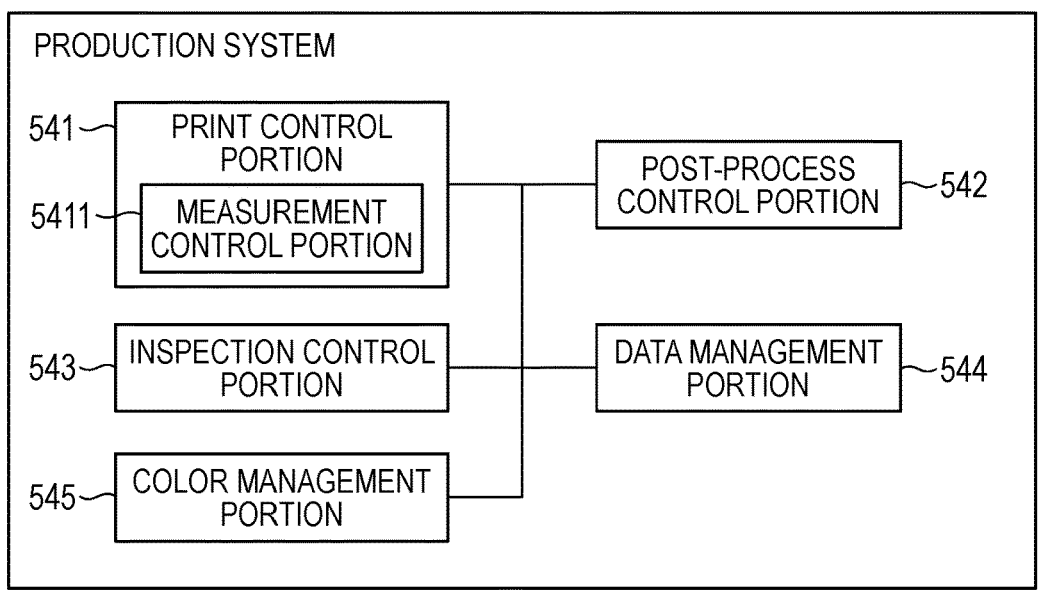
FIG. 5C is a block diagram for describing a software configuration according to Embodiment 1.

FIG. 5C is a block diagram illustrating a software configuration of the production system 120 according to the present embodiment. It should be noted that such software modules as illustrated are stored as programs in the HDD 304 in various devices and apparatuses configuring the production system 120, and are realized by the CPU 301 expanding and executing these programs into the RAM 303. Incidentally, the production system 120 comprises the printing apparatus 121, the print server 122, the post-processing apparatus 123 and the inspection apparatus 124. In the present embodiment, these four hardware units are regarded as one piece of hardware called the production system 120.

A print control portion 541 performs print control using the information (PDF, JDF) received from the workflow management server 100. The print control portion 541 also has an adjustment function for adjusting the print quality, and performs the adjustment function in response to a control instruction received from the workflow management server 100, the print server 122, or the operator terminal.

Besides, the print control portion 541 comprises a measurement control portion 5411. The measurement control portion 5411 performs measurement control by the measurement unit 322 in response to a control instruction received from any of the workflow management server 100, the print server 122 or the operator terminal.

A post-process control portion 542 performs post-process control in response to a control instruction received from the workflow management server 100.

An inspection control portion 543 performs inspection control by the inspection apparatus 124 in response to a control instruction received from the workflow management server 100.

The inspection control portion 543 compares the image data read by a sensor in the inspection apparatus 124 with reference image data. As a result of such comparison, when a difference exceeding a predetermined allowable range is detected, this portion identifies an inspection target object as being the target object not satisfying a quality request, and performs predetermined control such as notification to a user.

A data management portion 544 transmits information such as control results of various apparatuses of the production system 120 to the workflow management server 100. Further, the data management portion 544 performs other data transmission/reception with various devices and apparatuses. Incidentally, the data management portion 544 may be provided individually for each device or apparatus.

The color management portion 545 manages color quality of outputs by the printing apparatus 121 and the print server 122. More specifically, this portion controls a known color adjustment process and a confirmation process of color quality.

Figure 6A:
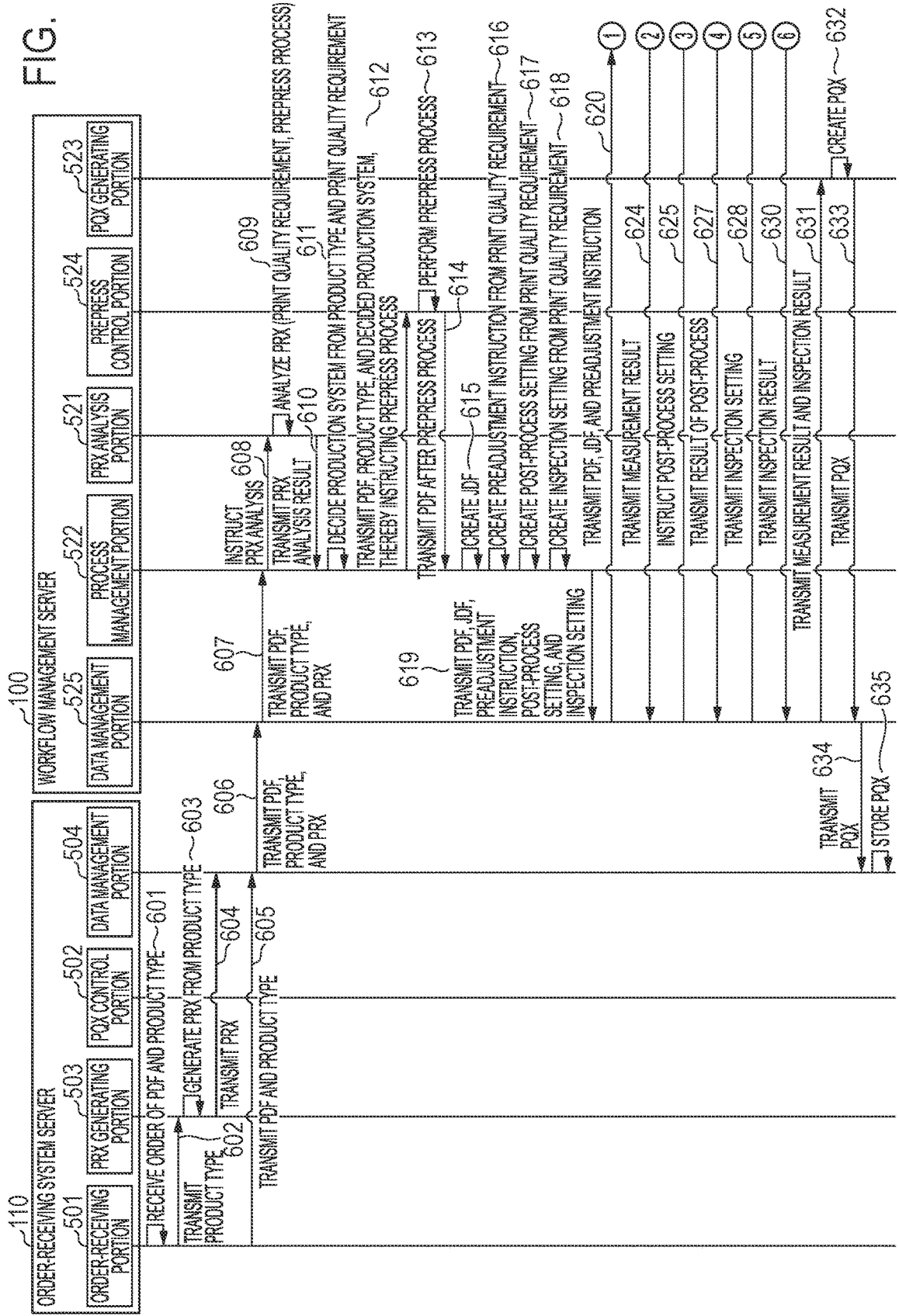
FIG. 6A is a sequence diagram for describing a software process according to Embodiment 1.
Figure 6B:
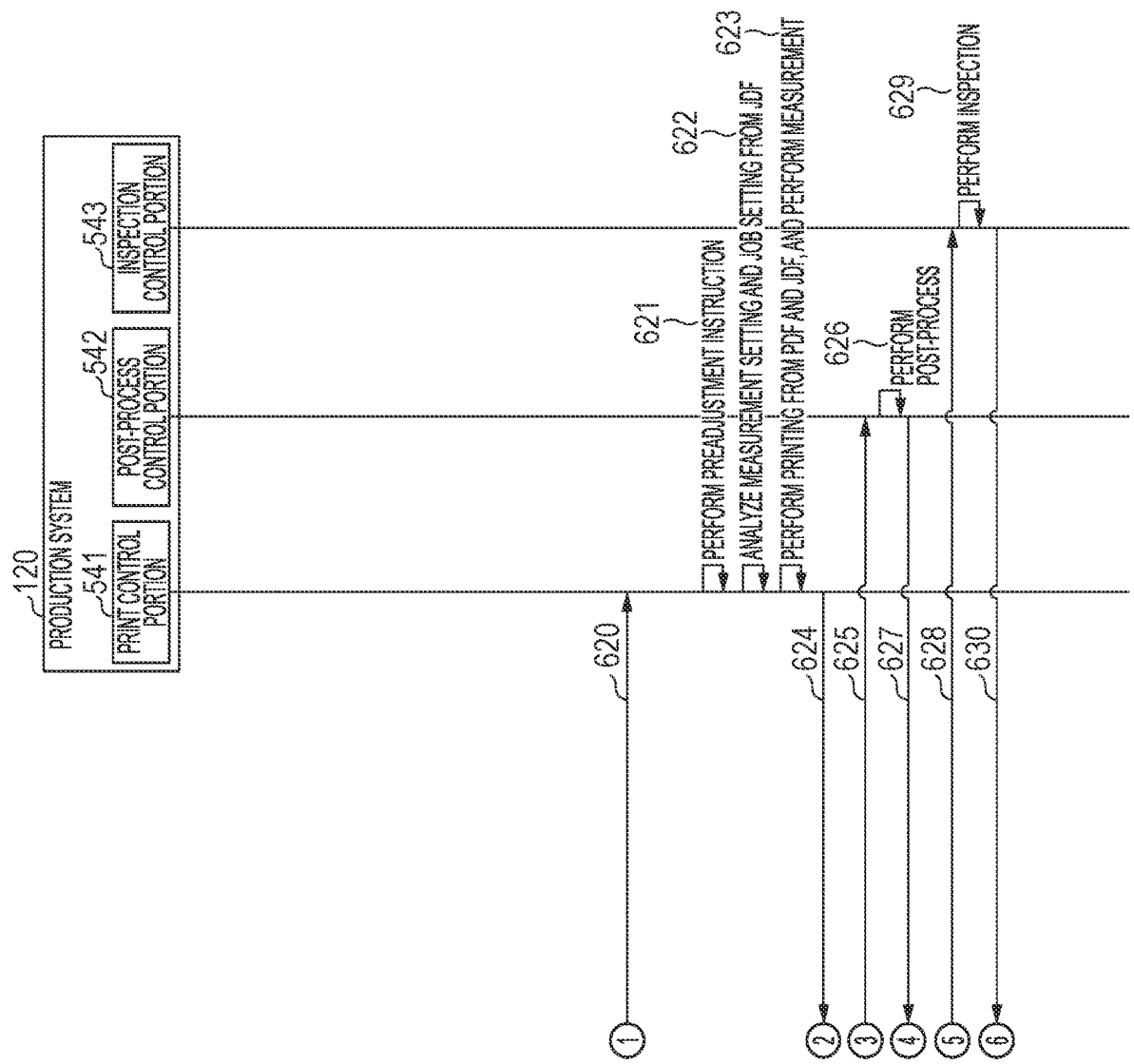
FIG. 6B is a sequence diagram for describing the software process according to Embodiment 1.

FIGS. 6A and 6B are sequence diagrams for describing a software process according to the embodiment.

In 601, the order-receiving portion 501 receives an order from an end user. The contents of the order include a PDF as print data, and a product type related to a deliverable. Here, the product type is information indicating a type of deliverable defined in advance by the order-receiving system server 110. For example, it is assumed that the order-receiving system server 110 defines in advance two product types, "Photo book" and "Name card". The product type "Photo book" represents the type of a product of finish size "A5", bookbinding type "Perfect binding", body text paper type "Glossy paper", and body text finish "Lamination". The product type "Name card" represents the type of a product of finish size "Name card", bookbinding type "None", and paper type "High-quality paper". By providing such product types, the types of products produced by the order-receiving system, the workflow management server 100, and the production system 120 are defined. Incidentally, the present embodiment will be described as the end user selecting "Photo book". Besides, although in the present embodiment the order-receiving system server 110 will be described as having a configuration in which this system defines the product type, the present invention is not limited to this. Namely, it may be also possible to adopt a configuration in which a salesperson manually inputs the order from the end user.

In 602, the order-receiving portion 501 transmits the product type received from the end user in 601 to the PRX generating portion 503. When the end user selects "Photo book" from the product type, this portion transmits that the selection of the end user is "Photo book" to the PRX generating portion 503.

In 603, the PRX generating portion 503 generates the PRX from the product type received from the order-receiving portion 501 in 602. First, an outline of the PRX to be generated in this process will be described.

As illustrated In FIG. 16, the PRX is configured by quality requests such as "MessageInfo", "BusinessInfo", "QualitySpec" and the like. Here, "Quality Spec" is configured by fields including quality specifications and evaluation standards. Besides, "BasisOfCalculation" represents information of a calculation formula designated by a buyer for specifying a print quality score or grade. Here, the buyer is an intermediary or the like who confirms an end user or an end user's request and inputs information to the system. Besides, "BasisOfCalculation" may be automatically set by the order-receiving system server 110 based on the information input by the buyer. Besides, "OverallGradingScale" represents meaning and rank of overall score and grade. Besides, "MinimumAcceptableRank" represents an acceptable lowest quality level. Besides, "QualityParameterSet" represents a score standard or the like for each of a color, a registration, an image defect and a bar code. Besides, "QualityParameterSetType" represents types of quality specifications such as the color, the registration, the image defect and the bar code. Besides, "ParameterSetName" represents a name of the quality specification. Besides, "ParameterSetScoringScale" represents a buyer's score standard definition.

Although in the present embodiment a configuration using a part of "QualitySpec" will be described, the present invention is not limited to this. It may be also possible to adopt a configuration using another field of the PRX. As an example of first "QualityParameterSet", there is a color variation inspection by the print control portion 541.

The print control portion 541 comprises the measurement control portion 5411, and thus can monitor color variation of the production system 120 while producing the print product. An example of a print color standard, there is "JapanColor". The production system 120 that satisfies this standard can prove that the quality of the print product is above a certain level. In the present embodiment, the color variation inspection is performed by confirming that the "JapanColor" standard is satisfied for each job.

The color variation is inspected based on an average value of a color difference ΔE00 (CIE DE2000) between a color measurement value of the print product produced by the production system 120 and a "JapanColor" prescribed value.

In this case, "Color variation inspection" is described in "ParameterSetName", and "Color" is described in "QualityParameterSetType". Besides, the followings are described in "ParameterSetScoringScale", that is, "DisplayLabe: RankColor1, Rank: 1, ValueRange: ΔE00 average value is 4 or more", "DisplayLabe: RankColor2, Rank: 2, ValueRange: ΔE00 average value is less than 4 and 3 or more", and "DisplayLabe: RankColor3, Rank: 3, ValueRange: ΔE00 average value is less than 3". In the present embodiment, the higher the "Rank" value, the higher the quality. Besides, the minimum quality level can be described by setting "Rank: 2" to "MinimumAcceptableRank" in this "QualityParameterSet".

As an example of second "QualityParameterSet", there is an appearance inspection of toner splash by the inspection apparatus. Before the production by the production system 120 starts, a correct image is obtained by a camera attached to the inspection apparatus, and the obtained correct image is registered in the inspection apparatus. During the production, the inspection apparatus obtains a printed result image by the camera, and compares the obtained image with the correct image to inspect the splash of toner. In this case, "Splash inspection" is described in "ParameterSetName". Besides, "Defects" is described in "QualityParameterSetType". Besides, the followings are described in "ParameterSetScoringScale", that is, "DisplayLabe: RankDefects1, Rank: 1, ValueRange: splash diameter 3 mm or more", "DisplayLabe: RankDefects2, Rank: 2, ValueRange: splash diameter less than 3 mm and 2 mm or more", and "DisplayLabe: RankDefects3, Rank: 3, ValueRange: splash diameter less than 2 mm". The higher the "Rank" value, the higher the quality. Besides, the minimum quality level can be described by setting "Rank: 2" to "MinimumAcceptableRank" in this "QualityParameterSet".

By using "QualityParameterSet" as above, the quality rank is calculated by "BasisOfCalculation". For example, in "BasisOfCalculation", an overall quality calculation formula by the "Rank" values of the color variation inspection and a splash inspection is described. More specifically, a calculation formula such as "TotalRank=Rank (Color variation inspection)×0.6+Rank (Splash inspection)×0.3" is described.

Here, it is assumed that "TotalRank" represents overall quality and "Rank (ParameterSetName)" represents "Rank" corresponding to "ParameterSetName". The meaning of the rank of quality calculated using "BasisOfCalculation" above is represented by "OverallGradingScale". The followings are described, that is, "DisplayLabe: Poor, Rank: 1", "DisplayLabe: Good, Rank: 2", and "DisplayLabe: Excellent, Rank: 3". The PRX representing a quality standard described so far will be described as being held by the PRX generating portion 503 as a fixed standard value.

The PRX generating portion 503 decides "MessageInfo", "BusinessInfo", "QualitySpec" and the like from the product type received in 602, and then generates the PRX. In the present embodiment, the PRX generating portion 503 decides "MinimumAcceptableRank" according to the product type. Here, it is assumed that "MinimumAcceptableRank" in "QualitySpec" is represented by the rank of quality defined by "OverallGradingScale". For example, in case of the product type "Photo book", "MinimumAcceptableRank" is decided to be "Good". Also, "MinimumAcceptableRank" existing in "QualityParameterSet" is also decided according to the product type. Besides, "MinimumAcceptableRank" in which "ParameterSetName" is "Color variation inspection" is described as "RankColor3". Besides, "MinimumAcceptableRank" in which "ParameterSetName" is "Splash inspection" is described as "RankDefects2". By doing so, each module that receives the PRX can interpret the quality request for printing, and thus can perform a process according to the quality request.

In 604, the PRX generating portion 503 transmits the PRX generated in 603 to the data management portion 504.

In 605, the order-receiving portion 501 transmits the PDF and product type received from the end user in 601 to the data management portion 504.

In 606, the data management portion 504 of the order-receiving system server 110 transmits the PDF and product type received from the end user and the PRX generated by the PRX generating portion 503 to the data management portion 525 of the workflow management server 100.

In 607, the data management portion 525 of the workflow management server 100 transmits the PDF, the product type and the PRX received from the data management portion 504 of the order-receiving system server 110 to the process management portion 522.

In 608, the process management portion 522 instructs the PRX analysis portion 521 to perform the PRX analysis. At this time, this portion transmits the PRX received in 607 to the PRX analysis portion 521.

In 609, the PRX analysis portion 521 decides the print quality requirement and the content of the prepress process, based on the PRX received from the process management portion 522. In the present embodiment, it is determined in which module "QualitySpec" is executed, by "QualityParameterSetType". It is assumed that, when "QualityParameterSetType" is "Color", "Quality Spec" is executed by the measurement control portion 5411, and, when "QualityParameterSetType" is "Defects", "QualitySpec" is executed by the inspection control portion 543. Besides, "Color variation inspection" of "ParameterSetName", "Color" of "QualityParameterSetType" and "RankColor3" of "MinimumAcceptableRank" described in the PRX in 603 are analyzed. Then, the print quality requirement "An inspection of ΔE00 is performed by the print control portion 541. The minimum quality standard is ΔE00 average value of less than 3." is identified. Further, "Splash inspection" of "QualitySpecName", "Defects" of "QualityParameterSetType" and "RankDefects2" of "MinimumAcceptableRank" separately described in the PRX in 603 are analyzed. Then, the print quality requirement "The inspection of splash width is necessary in the inspection apparatus. The minimum quality standard is the splash diameter of less than 3 mm and 2 mm or more." is identified. Further, the PRX analysis portion 521 determines presence/absence of the prepress process according to the print quality requirement.

In order to effectuate the print quality requirement "An inspection of ΔE00 is performed by the print control portion 541. The minimum quality standard is ΔE00 average value of less than 3.", printing of a specification (designation) chart and color measurement of the chart by the production system 120 are necessary. In the present embodiment, the color variation inspection is performed by inserting a patch into the edge of a paper and measuring a color of the patch with the measurement control portion 5411 included in the production system 120. More specifically, a process of embedding a "JapanColor" authentication chart (for example, 54 patches) in the PDF is necessary. For this reason, the PRX analysis portion 521 holds the contents of such a patch embedding process as an additional process necessary when performing the prepress process.

Although in the present embodiment the case where the process of inserting the patch is necessary has been described as an example, the present invention is not limited to this. Namely, it may be possible to adopt a form in which a patch chart in which only patches are allocated is generated and color measurement is performed. In this case, it is not necessary to additionally perform the process when performing the prepress process. Namely, it may be possible to make a form in which the color management portion provided in the production system generates the patch chart and reads the patches. At this time, the PRX analysis portion 521 stores the content of the instruction for the process management portion 522 so as to be able to send the process management portion 522 an instruction to generate and read the patch chart on the production system side.

In 610, the PRX analysis portion 521 transmits the print quality requirement and prepress process information analyzed from the PRX in 609 to the process management portion 522.

In 611, the process management portion 522 decides, from among the plurality of production systems 120 connected to the workflow management server 100, the production system 120 that actually performs the production, based on the product type received in 607 and the print quality requirement decided in 609. For example, in case of the photo book, cutting of sides other than a binding side is performed after printing and bookbinding by the production system 120. Further, in case of the photo book that is subjected to perfect binding, the size of a cover needs to be twice that of a body text. Therefore, in case of the photo book in which "A5" is specified as the finish size and "Glossy paper" is specified as the paper type of the body text, it is necessary to consider cutting after printing and printing on an A4 paper for the cover. At this time, the production system 120 that can handle printing on a glossy paper of A4 size or more is selected by the process management portion 522. Besides, there is a case where a hard cover is set as the cover of the photo book and thus printing cannot be performed by the production system 120 selected above. In this case, it may be possible to divide the PDF into the cover and the body text, and perform printing of a cover job and printing of a body text job using the plurality of production systems 120. Incidentally, it is assumed that printing capability of the production system 120 under the management of the workflow management server 100 is held by the data management portion 525 and the process management portion 522 can obtain the printing capability from the data management portion 525 as necessary.

Although in the present embodiment the production system is decided from the viewpoint as to whether or not a usable paper exists and whether or not a quality request can be satisfied, the present invention is not limited to this. For example, it may be possible to decide the production system based on the print job output number (number of copies) and productivity.

In 612, the process management portion 522 transmits the PDF and product type received in 606 and the production system 120 decided in 611 to the prepress control portion 524, and instructs the prepress process. Such a prepress process instruction includes the content of the prepress process decided by the PRX analysis portion 521 from the PRX in 609.

In 613, the prepress control portion 524 performs the prepress process in response to the prepress instruction received in 612. The contents of the prepress process mainly include two types. A first-type prepress process is decided from the product type, the production system 120, and the PDF. More specifically, there are an imposition process and the like. For example, in case of the photo book including the product type of the finish size "A5", print positions are designated for the "A4" paper for the cover and the "A5" paper for the body text. As for the cover, the page designated as the cover in the PDF is imposed on both the sides of the "A4" paper. As for the body text, the pages specified as the body text in the PDF are imposed on both the sides of the "A5" papers so as to be in the specified page order.

As another example, when a saddle stitch binding is designated, imposition is performed so as to be in the designated page order. A second-type prepress process is decided from the PRX in 609. Since the specific content of the second-type prepress process has already been described in 609, a description thereof is omitted here.

In 614, the prepress process unit transmits the PDF after the prepress process generated in 613 to the process management portion 522.

In 615, the process management portion 522 creates the JDF. For example, in case of the photo book, job information indicating finish size "A5", bookbinding type "Perfect binding", body text paper type "Glossy paper", and body text finish "Lamination" is set in the JDF. Besides, in a case where a measurement inspection by the print control portion 541 is included in the print quality requirement analyzed by the PRX analysis portion 521 in 609 and received in 610, a measurement instruction is set for the JDF. In the present embodiment, there is "An inspection of ΔE00 is performed by the print control portion 541. The minimum quality standard is ΔE00 average value of less than 3." as the print quality requirement. Therefore, it is instructed to perform the measurement by the measurement control portion 5411 during in job with the JDF.

In 616, the process management portion 522 creates an adjustment instruction based on the print quality requirement decided in 609. Here, preadjustment that needs to be performed before the production system 120 starts the production is described in the adjustment instruction. Examples of the preadjustment include front/back registration adjustment, a calibration instruction and the like in the production system 120. In the present embodiment, "An inspection of ΔE00 is performed by the print control portion 541. The minimum quality standard is ΔE00 average value of less than 3." is set as the print quality requirement of the photo book. Therefore, for example, as the preadjustment that can satisfy this quality request, a calibration instruction on the paper (glossy paper) used in the job is created as the adjustment instruction before the job start. Incidentally, it may be possible to cause an operator who manages the production system 120 to perform the adjustment instruction by creating it as an instruction sheet of adjustment, or to cause the production system 120 to perform the adjustment instruction by embedding information indicating the content of the adjustment instruction in the job. One or more apparatuses included in the production system 120 perform the calibration of the apparatuses based on the quality request data included in the job.

Although in the present embodiment the front/back registration adjustment and calibration are exemplarily described as the adjustment processes for satisfying the quality requests, the present invention is not limited to them. The adjustment processes may also include gradation correction, density correction, adjustments specific to the printing apparatus (gloss level correction, transfer voltage adjustment, etc.) held for each paper.

In 617, the process management portion 522 creates a post-process setting based on the print quality requirement decided in 609. This post-process setting represents a type of post-process to be performed by the post-process control portion of the production system 120. For example, in case of the photo book, a perfect binding instruction is created as a bookbinding method, and a lamination process instruction is created as a body text finish.

In 618, the process management portion 522 creates an inspection setting based on the print quality requirement decided in 609. This inspection setting represents type and standard of inspection to be performed by the inspection control portion 543 of the production system 120. In the present embodiment, the print quality requirement "The inspection of splash width is necessary in the inspection apparatus. The minimum quality standard is the splash diameter of less than 3 mm and 2 mm or more." analyzed by the PRX analysis portion 521 in 609 is created as the inspection setting. However, the quality standard for inspection is not limited to splash, but may include other quality standards such as a maximum density, a printing misregistration, finish process accuracy, and the like.

In 619, the process management portion 522 transmits the PDF, the JDF, the adjustment instruction, the post-process setting, and the inspection setting to the data management portion 525 in order to transmit them to the production system 120.

In 620, the data management portion 525 transmits the prepress-processed PDF created in 613, the JDF created in 615, and the adjustment instruction created in 616 to the print control portion 541.

In 621, the print control portion 541 performs the adjustment instruction received in 620. As described above, it may be possible to cause the operator who manages the production system 120 to perform the adjustment instruction by creating it as the instruction sheet of adjustment, or to cause the production system 120 to perform the adjustment instruction by embedding the information indicating the content of the adjustment instruction in the job.

In 622, the print control portion 541 analyzes a measurement setting and a job setting from the JDF received in 620. At this time, the measurement setting and job setting generated by the process management portion 522 in 615 are called.

In 623, the print control portion 541 performs the printing process from the PDF and JDF received in 620. At this time, the measurement is performed by the measurement control portion 5411 based on the measurement setting analyzed in 622.

In 624, the print control portion 541 transmits the measurement result measured in 623 to the data management portion 525 of the workflow management server 100. This measurement result is used by the later-described PQX generating portion 523 to generate the PQX. At this time, the location where the color measurement is performed is also transmitted.

In 625, the data management portion 525 instructs the post-process control portion 542 to perform the post-process created in 617. For example, in case of the photo book, the perfect binding is designated as the bookbinding method, and the lamination process is designated as the body text finish.

In 626, the post-process control portion 542 performs the post-process instructed by the data management portion 525 of the workflow management server 100 in 625. For example, in case of the photo book, the post-process of the perfect binding and lamination is performed on the print product printed in 623.

In 627, the post-process control portion 542 transmits a result of the post-process to the data management portion 525 of the workflow management server 100. Here, the result of the post-process includes an ID of the job that performed the post-process and information indicating that the post-process has been completed.

In 628, the data management portion 525 transmits the inspection setting created in 618 to the inspection control portion 543.

In 629, the inspection control portion 543 performs the inspection based on the inspection setting received in 628. In the present embodiment, "The inspection of splash width is necessary in the inspection apparatus. The minimum quality standard is the splash diameter of less than 3 mm and 2 mm or more." set in the inspection setting is effectuated. An inspection result is determined with OK (good product) or NG (defective product). The inspection result is transmitted to the data management portion 525 of the workflow management server 100 in 630 later described.

In 630, the inspection control portion 543 transmits the inspection result obtained in 629 to the data management portion 525 of the workflow management server 100. Although a description is omitted because it is publicly known, when the inspection control portion 543 determines the inspection result as NG because a deliverable (defective product) not satisfying the reference value of inspection setting is produced, the workflow management server 100 instructs the production system 120 to perform reproduction to make up for the defective product.

In 631, the data management portion 525 transmits the measurement result received in 624 and the inspection result received in 630 to the PQX generating portion 523.

In 632, the PQX generating portion 523 creates the PQX from the measurement result and inspection result received in 631. First, an outline of the PQX to be generated in this process will be described. As illustrated in FIG. 17, the PQX is configured by information related to production such as "MessageInfo", "PrinterInfo", "InkCollection", "SampleCollection" and the like. A typical field in the PQX will be described. Here, "SampleCollection" is configured by a set of "Samples" that are fields related to report information related to the production. More specifically, "ColorReport" represents report information related to a color, and "DefectReport" represents report information related to an image defect. Although in the present embodiment a configuration using a part of "SampleCollection" will be described, the present invention is not limited to this. Namely, a configuration using another field of the PQX may be used.

As an example of first "Sample", there is "ColorReport". In the present embodiment, in 623, the print control portion 541 performs the color measurement of the print product in the job. Then, the color measurement result and a color measurement location are received in 631 via the data management portion 525, and the report information related to the color is created. For example, a location where the color measurement is performed by the print control portion 541 is described in "PositionOnSample". The specific color measurement result is stored in a CxF format, and "ColorReport" and the color measurement result are associated with each other by "CxFSampleObjectIdLink".

As an example of second "Sample", there is "DefectReport". In the present embodiment, in 629, the inspection control portion 543 inspects the deliverable in the job. Then, the inspection result and an inspection location are received in 631 via the data management portion 525, and the report information related to the image defects is created. For example, a location where an image defect is detected by the inspection control portion 543 is described in "PositionOnSample". A size of the image defect is described in "DefectXMeasure", "DefectYMeasure", and "DefectUoM". Further, the number of image defects is described in "DefectCount".

In 633, the PQX generating portion 523 transmits the PQX created in 632 to the data management portion 525.

In 634, the data management portion 525 transmits the PQX received in 633 to the data management portion 504 of the order-receiving system server 110.

In 635, the data management portion 504 stores the PQX received in 634 in the data management portion 504. The PQX stored here can be viewed by the administrator of the order-receiving system server 110 as necessary, or can be disclosed to the end user via another system.

By constituting and configuring as described above, it is possible to make necessary adjustments while performing quality confirmation in regard to wide-ranging quality requests by each end user for each order-receiving job, so that it is possible to efficiently increase quality satisfaction for each job.

Here, although in the present embodiment the printing apparatus 121 has been described as an example of the production system 120, the present invention is not limited to this. Namely, the present invention can be applied to all production systems that perform from order reception to production.

Embodiment 2

In Embodiment 2, there will be described details of a configuration for reducing time and effort in which, by using device quality control applications, a worker manually performs color measurement and misregistration measurement of a production system and manually performs color calibration and registration calibration of a printing apparatus. In the present embodiment, particularly a process for automating a work of deciding and setting a measurement parameter based on a customer's quality request will be described.

Since the system configuration according to the present embodiment is the same as the content described in Embodiment 1, a description thereof is omitted.

FIG. 7 is a diagram for describing a database that holds measurement parameters for quality requests held by the data management portion 525. In the present embodiment, the workflow management server has the database corresponding to quality requests in advance. Besides, the workflow management server performs color quality confirmation, registration confirmation, image defect confirmation, and bar code quality confirmation as types of quality requests (ParameterSetType) specified by the PRX. Charts and print data to be printed in respective confirmations will be described with reference to FIGS. 9, 10A, 10B and 11.

Numeral 701 denotes a parameter of the PRX, and indicates "ParameterSetType" representing a type of quality request. In "ParameterSetType" of the PRX, "Color" is described in case of color quality confirmation, "Registration" is described in case of registration confirmation, "Defects" is described in case of image defect confirmation, and "Barcode" is described in case of bar code quality confirmation.

Numerals 702 and 703 denote parameters of the PRX, and "Name" indicating a type of chart to be used for measurement and "ID" indicating a chart number are respectively described in these parameters. In the present embodiment, "JapanColor", "GRAcoL" and "Fogra" are prepared as the types of charts of color quality requests, and the charts decided by respective authentication systems can be output.

However, the types of charts are not limited to them. In the present embodiment, each chart is assigned an ID, and the worker can identify what the measured data is by confirming a data name (chart name) in 704 and the number of patches in 705.

Figure 9:
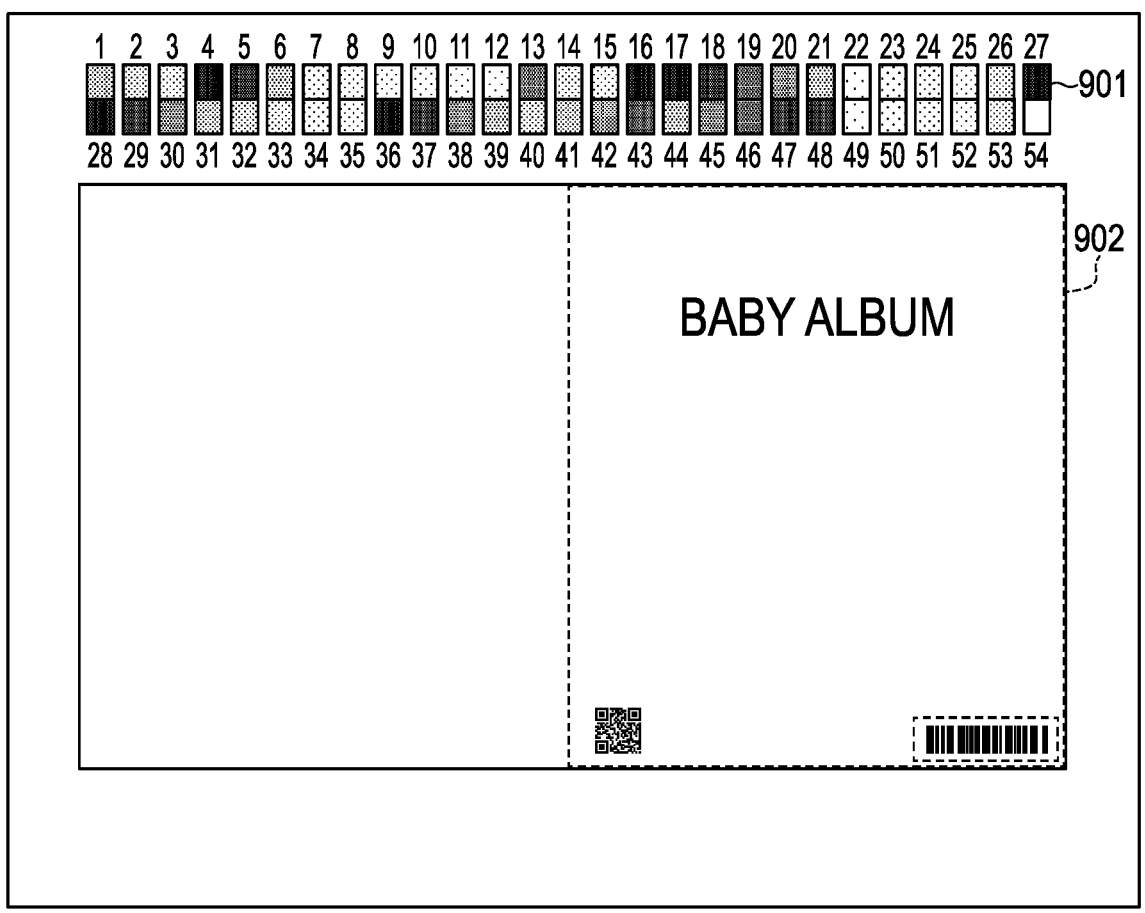
FIG. 9 is a diagram illustrating a measurement chart at a time when measuring color quality according to the embodiment.

For example, a measurement chart 901 illustrated in later-described FIG. 9 is a "Control strip" chart in which the number of patches of "JapanColor" is "54".

Numeral 706 denotes a patch number included in the data. The patch number is associated with a number assigned to the patch of a printed measurement chart as illustrated in FIG. 9.

A range surrounded by the frame line illustrated in FIG. 7 indicates the values of CMYK, Lab and drawing start position of the patch with the patch number 1. Numerals 707 to 710 denote respective CMYK values indicated by the patches in the measurement chart.

Numerals 711 to 713 denote Lab values indicated by the patches. Numerals 714 and 715 denote patch drawing start positions. Incidentally, the patch drawing start position is used not only for the color quality confirmation but also for the registration confirmation, the image defect confirmation, and the bar code quality confirmation. A value of the registration confirmation indicates the drawing start position of a black square patch allocated at each of the four corners of a paper, which will be described later with reference to FIGS. 10A and 10B. A value of the image defect confirmation indicates the drawing start position of a QR code™ which will be described later with reference to FIG. 11. Besides, a value of the bar code quality confirmation indicates the drawing start position of a bar code which will be described later with reference to FIG. 11.

Based on the PDF and product type received in 602, the process management portion 522 passes a paper type, paper size data and measurement chart information obtained from the product type to the prepress control portion 524.

FIG. 8 is a diagram illustrating a job management table at a time when the process management portion 522 in the present embodiment creates JDF data.

As described above, in 615, the process management portion 522 creates the JDF data for printing the printed deliverable from the product type. Numeral 801 denotes a job number of a print job to be printed by the production system.

The job number 801 represents the PDF data input from the order-receiving system server, in which the PDF data are listed as jobs by the process management portion 522 in the order received by the data management portion 525. The process management portion 522 uses this job management table to manage the printed deliverables. The process management portion 522 inputs the jobs in the order of job numbers, and the production system 120 performs printing in the order of job numbers.

Numeral 802 denotes a product type. The process management portion 522 stores the product type sent from the order-receiving system server 110 together with the PDF data for each job.

Numeral 803 denotes a bookbinding type. In the present embodiment, the bookbinding type is decided according to the product type. For each job, the process management portion 522 stores "Perfect binding" in case of "Photo book", and stores "None" in case of "Name card".

Numeral 804 denotes a paper type. In the present embodiment, the paper type is decided according to the product type. For each job, the process management portion 522 stores "Glossy paper" in case of "Photo book", and stores "High-quality paper" in case of "Name card".

Numeral 805 denotes a finish size. In the present embodiment, the finish size is decided according to the product type. For each job, the process management portion 522 stores "A5" in case of "Photo book", and stores "Name card" in case of "Name card".

Numeral 806 denotes a paper size, and numeral 807 denotes a post-process. The paper size is decided according to the finish size and post-process. In the present embodiment, in case of "Photo book", a "B4" paper is cut to an "A5" finish size. Besides, in case of "Name card", an "A4" paper is cut to a "Name card" size. For each job, the process management portion 522 determines and stores a value from the product type.

Numeral 808 denotes a print data storage location, and indicates a storage location (path) of the data management portion 525 in which the PDF data transmitted by the order-receiving system server 110 in 606 is stored. When the PDF data is stored in the data management portion 525 from the order-receiving system server 110, the process management portion 522 stores the storage location sent from the data management portion 525.

Numeral 809 denotes a quality request. The process management portion 522 stores, in 809, a result of the PRX analysis portion 521 obtained by analyzing the PRX data transmitted by the order-receiving system server 110 in 606 above.

Numeral 810 denotes QR data. In the present embodiment, as a result of analysis by the PRX analysis portion 521, the process management portion 522 stores the quality request 809 used for comparison when "Defects" is included in the quality request of 809. The prepress control portion 524 converts the data name into a QR code and creates the prepress data allocated at a location designated as the drawing start position.

Numeral 811 denotes a bar code number. The workflow management server assigns a bar code to the printed deliverable for management. This number is assigned serially to the printed deliverable, and is assigned by the process management portion 522 and stored in each job. The prepress control portion 524 creates the prepress data in which the bar code number transmitted from the process management portion 522 is allocated at a location designated as the drawing start position.

Numeral 812 denotes a prepress data storage location that is a location in which the process management portion 522 stores in 613 the PDF data after the prepress process generated by the prepress control portion 524.

FIG. 9 is the diagram illustrating a measurement chart at a time when measuring the color quality in the present embodiment. Here, this measurement chart is an example of a chart created by the prepress control portion 524 based on measurement chart data, a paper type and paper size data. The measurement chart data is obtained by the process management portion 522 based on the quality request data (PRX). Further, the paper type is obtained by the process management portion 522 from the PDF and product type received in 606. This example shows a case where a measurement chart according to a "JapanColor" certification system is selected for the color quality confirmation as the quality request and "Photo book" is selected as the product type.

Numeral 901 denotes the measurement chart, and numeral 902 denotes an image of a printed deliverable assigned to "Photo book". As described above, in the present embodiment, "Photo book" represents the type of deliverable: the finish size "A5", the bookbinding type "Perfect binding", the body text paper type "Glossy paper", the body text finish "Lamination".

When "Photo book" is selected as the printed deliverable, the printed paper is cut by the post-processing apparatus 123. Therefore, the prepress control portion 524 lays out the measurement data to a cutting place and outputs it in response to an instruction from the process management portion 522. Although the layout of the measurement chart at the time when performing the cutting process is illustrated in this drawing, the measurement chart data may be laid out on an entire page as described above. Thereafter, the production system 120 confirms the color quality according to the sequence illustrated in FIGS. 6A and 6B.

Figure 10A:
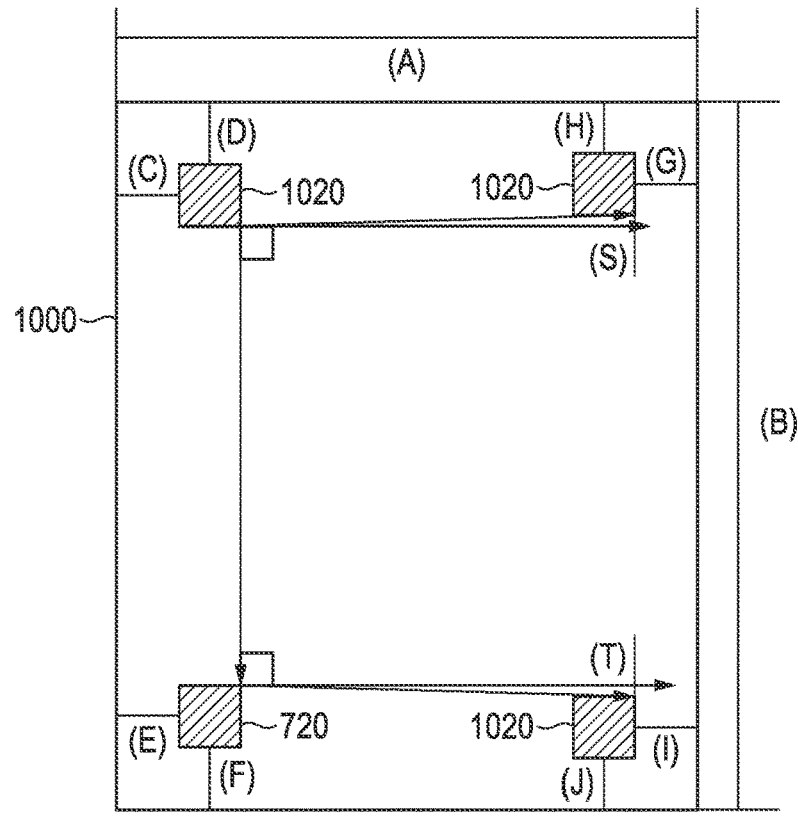
FIG. 10A is a diagram illustrating a measurement chart to be used for registration adjustment according to the embodiment.
Figure 10B:
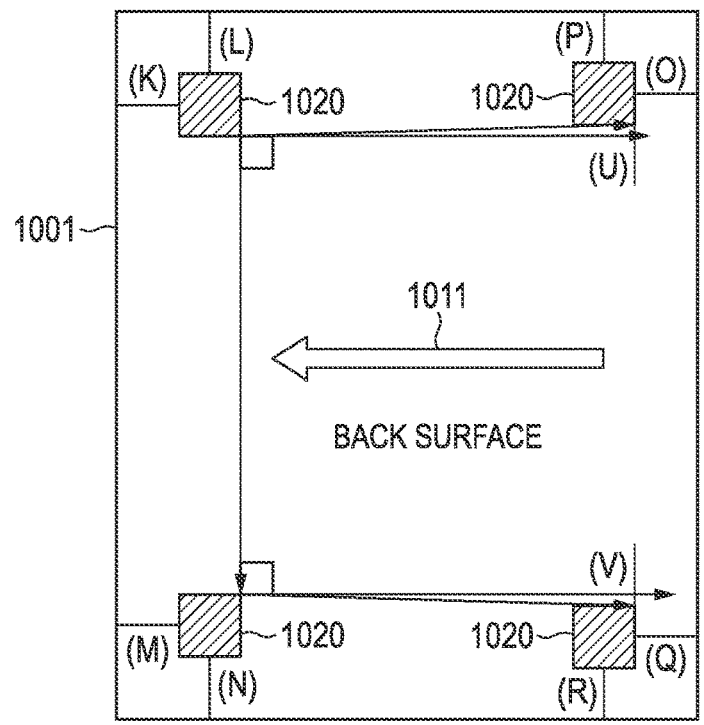
FIG. 10B is a diagram illustrating a measurement chart to be used for registration adjustment according to the embodiment.

FIGS. 10A and 10B are schematic diagrams illustrating an example of the measurement chart to be used for registration (printing position) adjustment. It should be noted that the adjustment chart is printed in response to the adjustment instruction from the process management portion 522 in 616 after print position adjustment is started.

Numeral 1000 denotes the front surface of the printed adjustment chart, and numeral 1001 denotes the back surface of the same adjustment chart as 1000. Numeral 1011 denotes an image printed on the adjustment chart so that an operator can identify a conveyance direction and front/back surfaces of the adjustment chart. In FIG. 10B, the paper conveyance direction is represented by the arrow, and the characters printed below indicate whether the illustrated side is the front side or the back side. However, these images are not indispensable information, that is, a configuration in which none of these images are printed may be adopted. In FIG. 10B, the display indicating the paper transport direction and the back side is formed such that the adjustment chart can be used even when the operator reads it by a reading apparatus.

Numerals 1020 denote marks respectively printed at specific positions on the adjustment chart. Incidentally, the mark 1020 is formed of toner of a color having a large difference in reflectance with respect to a normal paper. In the present embodiment, it is assumed that the mark 1020 is formed using black toner. The total eight marks 1020 are printed respectively at the four corners of the front and back surfaces of the adjustment chart. Each of the marks 1020 is image-allocated so as to be printed at a position away from the paper edge by a certain distance when a print position is ideal. By measuring the relative positions of the marks 1020 on the adjustment chart, a misregistration amount of the print position can be obtained. In the present embodiment, the portions represented by (A) to (V) in FIGS. 10A and 10B are measured. Here, (A) and (B) are the length in the sub-scanning direction and the length in the main-scanning direction of the adjustment chart, respectively, and ideal lengths are paper lengths defined in a paper library. Besides, each of (C) to (V) is the distance from a mark 720 to the nearest paper edge. The charts 1000 and 1001 are created as the prepress data by the prepress control portion 524 using front/back registration adjustment data pf the data name 704 illustrated in FIG. 7.

Figure 11:
FIG. 11 is a diagram illustrating a measurement chart for performing image defect confirmation and bar code quality confirmation according to the embodiment.

FIG. 11 is a diagram illustrating a sheet image on which the inspection control portion 543 of the production system 120 performs the image defect confirmation and bar code quality confirmation transmitted from the process management portion 522 of the workflow management server.

The inspection control portion 543 of the production system inspects the transmitted sheet image in accordance with inspection items set in advance on a not-illustrated setting screen of the inspection apparatus 124. Although there are various inspection items, an example in which a print content inspection and a bar code readable inspection are performed will be described here as an example.

Numeral 1101 in FIG. 11 denotes a sheet image obtained by reading a printed deliverable, that is, an image read by a not-illustrated camera of the inspection apparatus. In the present embodiment, in case of "Photo book", a bar code and a QR code indicating an inspection target are embedded in the cover by the prepress control portion 524 for printed deliverable management. Numeral 1102 in FIG. 11 denotes an inspection area to be an inspection target for image defect. Numeral 1103 denotes an inspection area to be an inspection target for bar code. The inspection apparatus 124 reads and analyzes the QR code on the sheet image (cover) 1101, and checks the analyzed QR code with the job management database of FIG. 8 managed by the data management portion 544 on the workflow management server 100, thereby identifying the data of the read sheet image. For example, in the present embodiment, the comparison image data of the file name stored in the data management portion 525 indicated by 808 of FIG. 8 is derived from the QR code. By comparing the comparison image data with the sheet image obtained by reading the printed deliverable, the inspection apparatus confirms the image defect.

Besides, the inspection apparatus 124 determines whether or not the bar code existing in the inspection area 1103 is readable. When readable, the bar code is printed normally, whereas when not readable, it is determined that the bar code printing does not satisfy the quality request.

Although the inspection apparatus 124 can perform other various inspections such as a color misregistration inspection, a tint inspection and the like, the present invention is not limited to such inspection contents. Therefore, descriptions thereof are omitted. Besides, in the present embodiment, the settings of the inspection area and inspection content for the inspection apparatus 124 are performed from the not-illustrated setting screen on the inspection apparatus. However, as another constitution, it may be possible to set the setting from the workflow management server 100 via a communication line.

FIGS. 12A and 12B are flow charts for respectively describing the operations of the workflow management server 100 and the production system 120 according to the present embodiment.

Hereinafter, control in each step of the flow charts of FIGS. 12A to 14 realizes various operations by the CPU 221 reading and executing control programs in the ROM 222.

FIG. 12A is the flow chart for describing the operation of the workflow management server, in which the operation is performed after the product type, the PDF data and the quality request (PRX) data are input to the process management portion 522 from the order-receiving system server 110 and the job information is managed using the job management database.

In S1201, the process management portion 522 causes the PRX analysis portion 521 to analyze the quality request included in the PRX data based on the quality request database of FIG. 7. The operation of the PRX analysis portion 521 will be described later with reference to FIG. 13. The PRX analysis portion 521 transmits a result of analyzing the quality request data to the process management portion 522, and the process management portion 522 stores the result in 809 of FIG. 8.

In S1202, the process management portion 522 stores the values such as the product type 802, the bookbinding type 803, the paper type 804, the finish size 805, the paper size 806, the post-process 807 and the like that are decided in advance in the present embodiment, based on the product type to be input.

In S1203, the process management portion 522 sends the information related to the bookbinding type 803, the paper type 804, the finish size 805, the paper size 806 and the post-process 807 to the prepress control portion 524. The prepress control portion 524 obtains the patch values (706 to 715) from the measurement parameter database of FIG. 7, and creates the PDF data after the prepress process. The created data after the prepress process is stored in the data management portion 525 in the form of PDF, and the prepress data storage location is transmitted to the process management portion. The process management portion 522 stores the prepress data storage location received from the prepress control portion 524, in 812 of the job management database of FIG. 8.

In S1204, the process management portion 522 transmits the data after the prepress process, the JDF data, the adjustment instruction and the inspection setting to the production system. At this time, the process management portion 522 transmits the adjustment instruction by including it with the JDF data.

FIG. 12B is the flow chart for describing the operation of the production system 120, and indicates the operation of the production system 120 after receiving the measurement data and a measurement command. The operation of this flow chart is performed after the production system 120 is activated.

In S1205, the print control portion 541 waits for the data after the prepress process, the JDF, the adjustment instruction and the inspection setting. When the production system 120 receives the data after the prepress process (measurement data) and the measurement command including the JDF, the adjustment instruction and the inspection setting transmitted from the workflow management server 100 in S1204, the process advances to S1206.

In S1206, the production system 120 performs a registration adjustment quality request (preadjustment) based on the data after the prepress process and the adjustment instruction. Then, in S1207, the printed deliverable is printed from the data after the prepress process and the JDF data. In addition, the printed deliverable after the printing is measured using the inspection setting.

Figure 13:
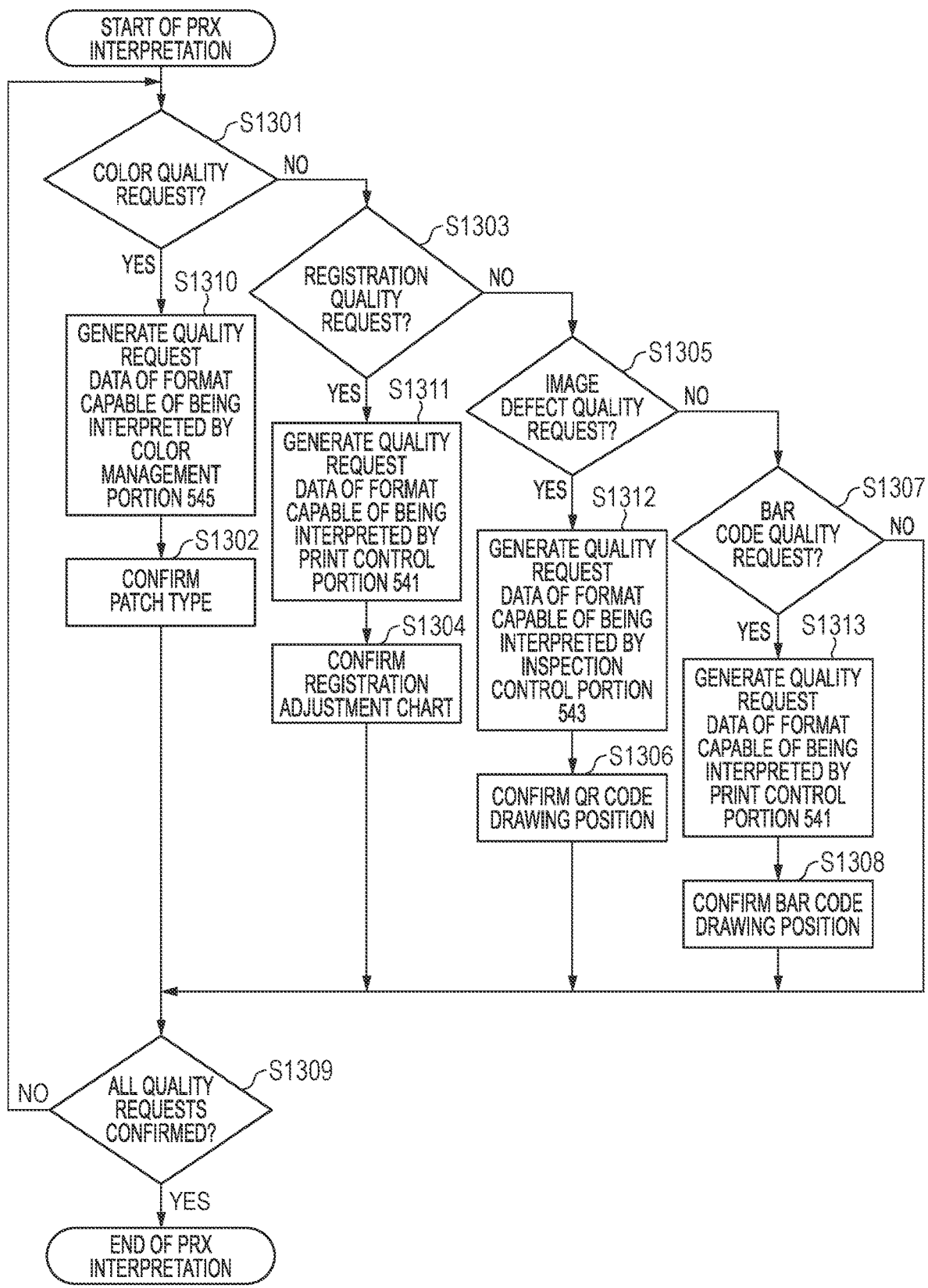
FIG. 13 is a flow chart for describing an operation of a PRX analysis portion according to the embodiment.

Next, a process in which the PRX analysis portion 521 analyzes the quality request included in the PRX data based on the quality request database of FIG. 7 will be described with reference to the flow chart of FIG. 13. The operation of this flow chart is started when the PRX analysis portion 521 interprets the PRX in S1201 of FIG. 12A.

In the operation of this flow chart, the PRX analysis portion 521 sequentially determines whether or not the color quality request, a registration quality request, an image defect quality request and a bar code quality request exist in "ParameterSetType". In a case where the target quality request exists, the PRX analysis portion 521 performs a process of adding a quality request value set in "ParameterSetType" 701 corresponding to the target quality request to the job management database of FIG. 8.

The color quality request is, for example, a request for designating an allowable range of a color difference that is a difference between a reference color value and a color value of an actual printed result. For example, the color difference can be specified by measuring a result of printing a predetermined patch corresponding to a reference value such as "JapanColor" and comparing the reference value with the measurement result. As described above, in the PRX, when the color quality request is specified, "Color" is described in "QualityParameterSetType". Further, a quality rank and a degree of color difference according to the quality rank are described in "ParameterSetScoringScale".

The registration quality request is a request for designating an allowable range of a misregistration (displacement) of an image drawing position on a paper. For example, the misregistration of the image drawing position includes a misregistration between an image drawn on the front side of the paper and an image drawn on the back side thereof. Otherwise, even in an image drawn on one side of a paper, there is, as a misregistration, a misregistration from a reference in relation to a relative relationship between a drawing content and a reference position on the paper, a misregistration of drawing positions for respective color plates, or the like. In the PRX, when the registration quality request is specified, "Registration" is described in "QualityParameterSetType". Further, a quality rank and a degree of misregistration according to the quality rank are described in "ParameterSetScoringScale".

The image defect quality request is, for example, a request for designating an allowable range of an image defect such as occurrence of density unevenness, toner splash, or the like. The followings are described in "ParameterSetScoringScale". In the PRX, when the image defect quality request is specified, "Defects" is described in "QualityParameterSetType". Further, a quality rank and a degree of image defect (toner splash range, or the like) according to the quality rank are described in "ParameterSetScoringScale".

The bar code quality request indicates, for example, print quality or print type of a bar code printed on a deliverable. The print quality of the bar code indicates, for example, a degree of readability of the bar code. For example, it is assumed that a change in a gradation level difference occurring in gradation correction affects bar code reading quality so that a bar code reading error occurs. Therefore, the content of gradation correction can be controlled by defining the quality of bar code.

First, a process corresponding to the color quality request will be described. In S1301, the PRX analysis portion 521 determines whether or not the color quality request exists in "ParameterSetType", based on whether or not "Color" illustrated in FIG. 7 exists. When determined that the color quality request does not exist, the process advances to S1303. On the other hand, when determined that the color quality request exists, the process advances to S1310.

In S1310, the PRX analysis portion 521 generates quality request data of a format that can be interpreted by the color management portion 545, based on the contents related to the color quality request described in "ParameterSetScoringScale". This quality request data is data to be used by the production system 120 for performing adjustment to produce a required-quality deliverable. For example, data representing information indicating an allowable range of a color difference with respect to a reference value (patch data) in an XML, or JDF format is generated. In this way, a job including information used for quality adjustment to be performed by the production system 120 is generated based on an interpretation result. The PRX analysis portion 521 advances the process to S1302. Incidentally, the generated quality request data is transmitted to the color management portion 545 provided in the printing apparatus 121 or the print server 122.

In S1302, the PRX analysis portion 521 reads the value of the ID 703 described in "Color". Then, the PRX analysis portion 521 writes a value "Color1" obtained by combining "Color" representing the corresponding color quality request and "1" of the ID 703, in the column of quality request of the job management database illustrated in FIG. 8. Then, the process advances to S1309, and the PRX analysis portion 521 determines whether or not all the quality requests existing in "ParameterSetType" have been confirmed. In the present embodiment, it is determined that all the quality requests have been confirmed by entirely reading "QualityParameterSet" of the PRX.

When all the color quality requests have been confirmed in "ParameterSetType", the process advances to S1303. In S1303, the PRX analysis portion 521 determines whether or not the registration quality request exists in "ParameterSetType", based on whether or not "Registration" illustrated in FIG. 7 exists. When determined that the registration quality request does not exist, the process advances to S1305. On the other hand, when determined that the registration quality request exists, the process advances to S1311.

In S1311, the PRX analysis portion 521 generates quality request data of a format that can be interpreted by the print control portion 541, based on the content described in "ParameterSetScoringScale" related to the registration quality request. This quality request data is data to be used by the production system 120 for performing adjustment to produce a required-quality deliverable. For example, data expressing an allowable range of a misregistration for drawing an image on a paper in the XML, or JDF format is generated. In this way, a job including information used for the quality adjustment to be performed by the production system 120 is generated based on an interpretation result. The PRX analysis portion 521 advances the process to S1304. Incidentally, the generated registration quality request data is transmitted to the print control portion 541 provided in the printing apparatus 121 or the print server 122.

In S1304, the PRX analysis portion 521 reads the value "40" of the ID 703 described in "Registration" described in "ParameterSetType". Then, the PRX analysis portion 521 writes "Registration40" obtained by combining "Registration" representing the corresponding registration adjustment and "40" of ID 703, in the job management database quality request 809 of the job management database illustrated in FIG. 8. Subsequently, the process advances to S1309.

When all the registration quality requests have been confirmed in "ParameterSetType", the process advances to S1305. In S1305, the PRX analysis portion 521 determines whether or not the image defect quality request exists in "ParameterSetType", based on whether or not "Defects" illustrated in FIG. 7 exists. When determined that the image defect quality request does not exist, the process advances to S1307. On the other hand, when determined that the image defect quality request exists, the process advances to S1312. In S1312, the PRX analysis portion 521 generates quality request data of a format that can be interpreted by the inspection control portion 543, based on the content described in "ParameterSetScoringScale" related to the image defect quality request. This quality request data is data to be used by the production system 120 for performing adjustment to produce a required-quality deliverable. For example, data expressing an allowable range of an image defect such as occurrence of density unevenness, toner splash or the like in the XML or JDF format is generated. In this way, a job including information used for the quality adjustment to be performed by the production system is generated based on an interpretation result. The PRX analysis portion 521 advances the process to S1306. Incidentally, the generated image defect quality request data is transmitted to the inspection control portion 543 provided in the inspection apparatus 124.

In S1306, the PRX analysis portion 521 reads the value "50" of the ID 703 described in "Defects". Then, the PRX analysis portion 521 writes "Defects50" obtained by combining "Defects" representing the corresponding image defect confirmation and "50" of the ID 703 in the column of the quality request 809 of the job management database illustrated in FIG. 8. Subsequently, the process advances to S1309.

When all the image defect quality requests have been confirmed in "ParameterSetType", the process advances to S1307. In S1307, the PRX analysis portion 521 determines whether or not the bar code quality request exists in "ParameterSetType", based on whether or not "Barcode" illustrated in FIG. 7 exists. When determined that the bar code quality request does not exist, the process advances to S1309. On the other hand, when determined that the bar code quality request exists, the process advances to S1313.

In S1313, the PRX analysis portion 521 generates quality request data of a format that can be interpreted by the print control portion 541, based on the content described in "ParameterSetScoringScale" related to the bar code quality request. This quality request data is data to be used by the production system 120 for performing adjustment to produce a required-quality deliverable. For example, data expressing an allowable range of bar code print quality in the XML or JDF format is generated. In this way, a job including information used for the quality adjustment to be performed by the production system is generated based on an interpretation result. The PRX analysis portion 521 advances the process to S1308. Incidentally, the generated bar code quality request data is transmitted to the print control portion 541 provided in the printing apparatus 121 or the print server 122.

In S1308, the PRX analysis portion 521 reads the value "60" of the ID 703 described in "Barcode". Then, the PRX analysis portion 521 writes "Barcode60" obtained by combining "Barcode" representing the corresponding bar code quality confirmation and "60" of the ID 703 in the column of the quality request 809 of the job management database illustrated in FIG. 8. Subsequently, the process advances to S1309.

When it is determined in S1309 that the PRX analysis portion 521 has confirmed all the quality requests existing in "ParameterSetType", the process of this flow chart ends. When the process of this flow chart ends, for all the quality requests existing in "ParameterSetType", all the quality request values set in "ParameterSetType" 701 respectively corresponding to the quality requests are stored in the job management database of FIG. 8. Here, "ParameterSetType" stored in the job management database of FIG. 8 is used by the prepress control portion 524 to create the data after the prepress process in S1203.

Figure 14:
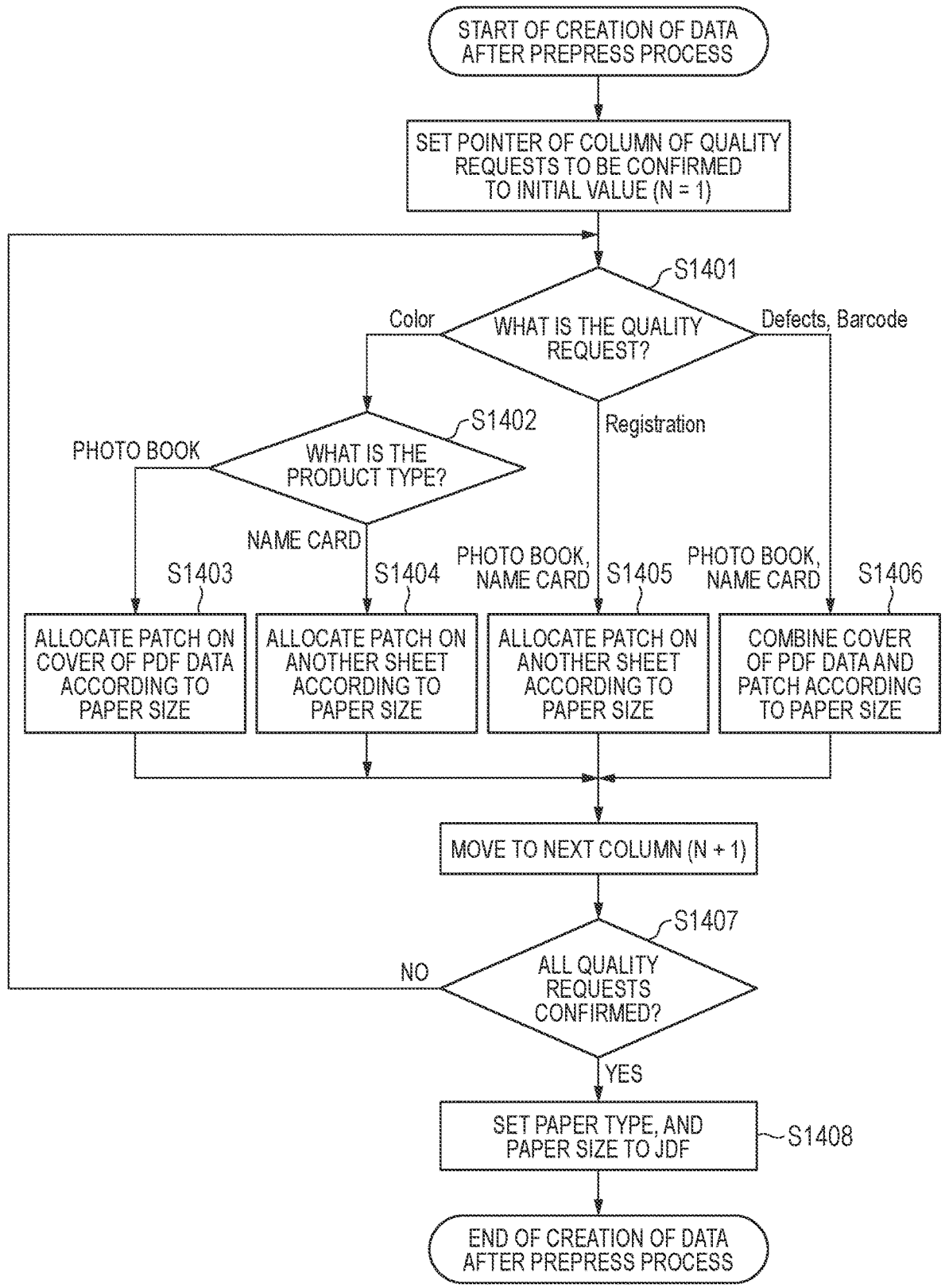
FIG. 14 is a flow chart for describing an operation for generating data of a prepress process according to the embodiment.

Next, a process in which the prepress control portion 524 generates the PDF data after the prepress process based on the quality request database of FIG. 7 and the job management database of FIG. 8 will be described with reference to the flow chart illustrated in FIG. 14. The operation of this flow chart is started when the prepress control portion 524 creates the data after the prepress process in S1203 of FIG. 12A.

In the operation of this flow chart, in the quality request 809 of FIG. 8, the prepress control portion 524 sequentially determines whether or not the color quality request, a registration quality request, the image defect quality request and the bar code quality request exist in the job. In a case where the target quality request exists, the prepress control portion 524 allocates or combines the patch value (706 to 715) set in the ID 703 of FIG. 7 corresponding to the target quality request, in the PDF data of the printed deliverable stored in the print data storage location of FIG. 8. Then, the prepress control portion 524 performs a process of adding the created PDF data after the prepress process to the job management database of FIG. 8.

First, a process corresponding to the color quality request will be described. In S1401, the prepress control portion 524 determines whether or not the color quality request exists in the quality request 809, based on whether or not the character string "Color" illustrated in FIG. 7 exists. When determined that the color quality request exists, the process advances to S1402. The prepress control portion 524 obtains the product type included in the job from the product type 802 of FIG. 8. In a case where the product type is "Photo book", the process advances to S1403, and the prepress control portion 524 allocates the PDF data of the print data storage location 808 on a "B4" paper according to the paper size 806. Further, the prepress control portion 524 reads a numeral described in the quality request 809, compares it with the value of the ID 703 of FIG. 7 to obtain the patch value (706 to 715), and allocates the patch on the cover. In case of "Photo book", the patch can be allocated in a margin part to be cut.

In a case where the product type is "Name card", the process advances to S1404, and the prepress control portion 524 allocates the PDF data of the print data storage location 808 on an "A4" paper according to the paper size 806. Further, the prepress control portion 524 reads a numeral described in the quality request 809, compares it with the value of the ID 703 of FIG. 7 to obtain the patch value (706 to 715), and allocates and adds the patch on another paper. Subsequently, the process advances to S1407, and the prepress control portion 524 determines whether or not all the quality requests existing in the quality request 809 of FIG. 8 have been confirmed. In the present embodiment, it is determined that all the quality requests have been confirmed, by reading all the quality requests in the job management database of FIG. 8. As just described, the prepress control portion 524 decides and stores the patches to be used by the production system 120 based on the parameters included in the quality requests. Besides, the prepress control portion 524 decides the allocation positions of the patches based on the product types.

When all the color quality requests have been confirmed in the quality request 809, the process advances to S1401. In S1401, the prepress control portion 524 determines whether or not the registration quality request exists in the quality request 809, based on whether or not the character string "Registration" illustrated in FIG. 7 exists. When determined that the registration quality request exists, the process advances to S1405, and the prepress control portion 524 allocates the PDF data of the print data storage location 808 on the "B4" paper in case of "Photo book" and on the "A4" paper in case of "Name card", according to the paper size 806. Further, the prepress control portion 524 reads a numeral described in the quality request 809, compares it with the value of the ID 703 of FIG. 7 to obtain the patch value (706 to 715), and allocates and adds the patch on another paper. Since in case of the front/back registration adjustment data adjustment is performed using the entire surface of a paper, allocation and addition on a separate paper are necessary. Subsequently, the process advances to S1407, and the prepress control portion 524 determines whether or not all the quality requests existing in the quality request 809 of FIG. 8 have been confirmed. In the present embodiment, it is determined that all the quality requests have been confirmed, by reading all the quality requests in the job management database of FIG. 8. When all the registration quality requests have been confirmed in the quality request 809, the process advances to S1408.

In S1401, the prepress control portion 524 determines whether or not the image defect quality request or the bar code quality request exists in the quality request 809, based on whether or not the character string "Registration" or "Barcode" illustrated in FIG. 7 exists. When determined that the image defect quality request or the bar code quality request exists, the process advances to S1406, and the prepress control portion 524 allocates the PDF data of the print data storage location 808 on the "B4" paper in case of "Photo book" and on the "A4" paper in case of "Name card", according to the paper size 806. Further, the prepress control portion 524 reads a numeral described in the quality request 809, compares it with the value of the ID 703 of FIG. 7 to obtain the patch value (706 to 715), and combines and adds the patch on the data of the cover. As described with reference to FIG. 11, since the image defect quality request and the bar code quality request are confirmed using the cover of the printed deliverable, it is necessary to combine them to the cover. Subsequently, the process advances to S1407, and the prepress control portion 524 determines whether or not all the quality requests existing in the quality request 809 of FIG. 8 have been confirmed. In the present embodiment, it is determined that all the quality requests have been confirmed, by reading all the quality requests in the job management database of FIG. 8.

According to the present embodiment, it is possible, based on the contents of the print quality requests described in the PRX, to generate an instruction executable by the production system and transmit the generated instruction to the production system.

Embodiment 3

In Embodiment 2, when the workflow management server 100 generates the measurement data and measurement command, this server transmits them to the production system. In the market, when the worker performs the works such as a color measurement adjustment, the registration adjustment, the inspection and the like, he/she manages their work hours using the work instruction sheet such as the adjustment instruction sheet or the like issued by the workflow management server, and a bar code reader.

Figure 15A:
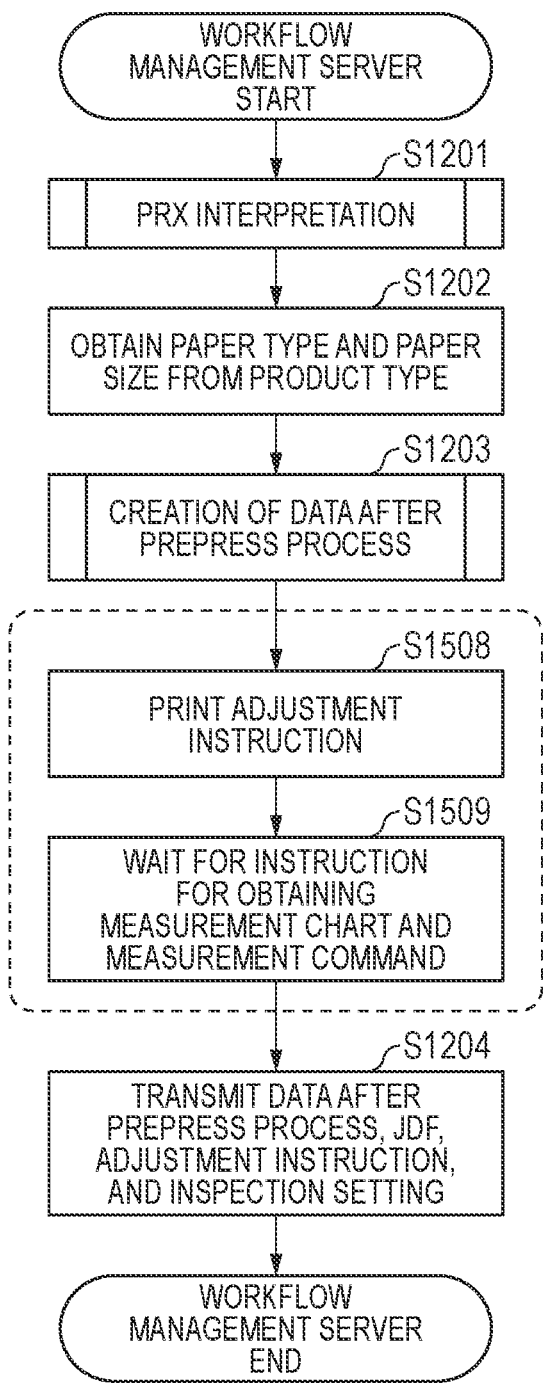
FIG. 15A is a flow chart for describing an operation of the workflow management server according to the embodiment.

In Embodiment 3, there will be described an example in which, as illustrated in FIG. 15A, after the workflow management server 100 creates the data after the prepress process, worker's work time is recorded by printing the adjustment instruction sheet using the production system and reading the printed adjustment instruction sheet using the bar code reader.

Since the constitution and configuration according to the present embodiment are the same as those of Embodiment 1, descriptions thereof are omitted.

Figure 15B:
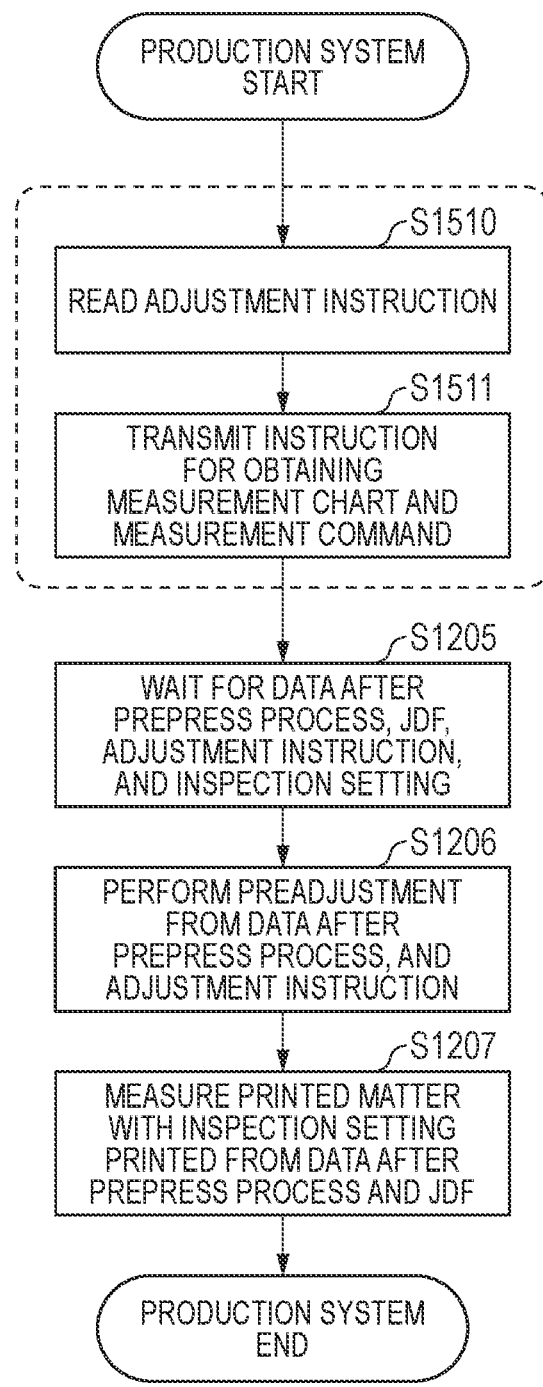
FIG. 15B is a flow chart for describing an operation of the production system according to the embodiment.

FIGS. 15A and 15B are flow charts for describing operations of the workflow management server 100 and the production system 120 in the present embodiment. In this flow chart, characteristic control operations in the present embodiment of the workflow management server 100 that outputs a measurement chart and a measurement command of quality requests and the production system 120 that receives and performs them will be described. Differences between FIGS. 12A and 12B and FIGS. 15A and 15B are indicated by portions surrounded by the dotted lines in FIGS. 15A and 15B.

FIG. 15A is the flow chart for describing the operation of the workflow management server 100.

In S1203, as described above with reference to FIGS. 12A and 12B and FIG. 14, the prepress control portion 524 of the workflow management server 100 creates the data after the prepress process in accordance with the quality request. In Embodiment 3, in S1508, the process management portion 522 prints the adjustment instruction sheet including a measurement data obtaining instruction and a measurement command obtaining instruction. At this time, the measurement data obtaining instruction to be printed on the adjustment instruction sheet is set and printed by converting the value of the prepress data storage location 812 managed in the job management database of FIG. 8 into a QR code. Besides, the color measurement command instruction is set and printed by converting the bar code number 811 serially managed for each job into a bar code. The same QR code and bar code are also printed on the cover when the image defect quality request and the bar code quality request have been added to the PRX data. The production system 120 may read the cover by the bar code reader. After printing the adjustment instruction sheet in S1508, the process waits for the print control portion 541 to transmit an obtaining instruction in the flow chart S1509 of the production system 120. In S1204, when the process management portion 522 receives the obtaining instruction of the measurement data and measurement command, this portion transmits the data after the prepress process, the JDF, the adjustment instruction and the inspection setting to the production system 120.

Next, the operation on the side of the production system 120 will be described. FIG. 15B is the flow chart for describing the operation of the production system 120. The operation of this flow chart is performed after the production system is activated.

In the present embodiment, in S1510, the print control portion 541 of the production system 120 reads the adjustment instruction sheet using the not-illustrated bar code reader as described above with reference to FIG. 15A. The print control portion 541 reads the QR code given to the adjustment instruction sheet, and the bar code of the bar code number serially set for the job in the workflow management server 100. Consecutively, in S1511, the print control portion 541 transmits as the obtaining instruction the bar code number, and the storage location information of the data after the prepress process to the workflow management server 100.

The production system 120 reads the printed adjustment instruction sheet using the connected not-illustrated bar code reader or the like, so that the print server 122 and the inspection apparatus 124 obtain the prepress-processed PDF data including the comparison data necessary for the adjustment and inspection for satisfying the quality requests. In this way, the production system 120 can not only perform the preadjustment and inspection, but manage the work time by the workflow management server 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 110 order-receiving system server
100 workflow management server
120 production system
201 CPU
521 PRX analysis portion
525 data management portion

The invention claimed is:

1. An information processing apparatus comprising:
at least one memory that stores instructions; and
at least one processor that causes, by performing the instructions, the information processing apparatus to:
receive, via a network from an external apparatus, image data and quality request data;
interpret the received quality request data;
determine, based on the interpreted quality request data, a printing quality requirement;
transmit an adjustment instruction for performing an adjustment to satisfy the determined printing quality requirement to a production system, the adjustment being performed prior to printing based on the image data;
transmit the image data to the production system;
transmit, based on the interpreted quality request data, a print setting for executing the printing based on the image data to the production system;
transmit, based on the determined printing quality requirement, an inspection setting for inspecting whether a print product output by the printing satisfies the determined printing quality requirement to the production system; and
receive an inspection result of the print product from the production system.

2. The information processing apparatus according to claim 1, wherein the quality request data includes at least any one of a color quality request indicating an allowable range of a color difference of a color value of image of a deliverable in relation to a reference value, a registration quality request indicating an allowable range of a misregistration of image in relation to a reference position, a quality request of image defect indicating an allowable range of an image defect, and a bar code quality request indicating an allowable range of a quality of a bar code printed on a deliverable.

3. The information processing apparatus according to claim 1, wherein the quality request data is received according to Print Requirement eXchange format (PRX).

4. The information processing apparatus according to claim 1, wherein the quality request data is received for each job.

5. The information processing apparatus according to claim 1, wherein the adjustment is calibration.

6. The information processing apparatus according to claim 1, wherein the production system is configured to comprise a printing apparatus and a print server.

7. The information processing apparatus according to claim 1, wherein the production system is configured to comprise at least an inspection apparatus, and
wherein the inspection setting is used by the inspection apparatus.

8. The information processing apparatus according to claim 1, wherein the at least one processor further causes, by performing the instructions, the information processing apparatus to:
generate a report based on the received inspection result; and
output the generated report.

9. The information processing apparatus according to claim 8, wherein a data format of the report is PQX.

10. The information processing apparatus according to claim 1, wherein the at least one processor further causes, by performing the instructions, the information processing apparatus to execute, based on the interpreted quality request data, an image processing to the received image data, and
wherein the image data to which the image processing is executed is transmitted to the production system.

11. The information processing apparatus according to claim 1, wherein the adjustment is a front and back registration adjustment.

12. A controlling method for an information processing apparatus, the controlling method comprising:
a receiving step of receiving, via a network from an external apparatus, image data and quality request data;
an interpretation step of interpreting the quality request data received in the receiving step;
a determining step of determining, based on the quality request data interpreted in the interpretation step, a printing quality requirement;
a transmitting step of transmitting an adjustment instruction for performing an adjustment to satisfy the printing quality requirement determined in the determining step to a production system, the adjustment being performed prior to printing based on the image data;
a transmitting step of transmitting the image data to the production system;
a transmitting step of transmitting, based on an interpretation result in the interpretation step, a print setting for executing the printing based on the image data to the production system;
a transmitting step of transmitting, based on the printing quality requirement determined in the determining step, an inspection setting for inspecting whether a print product output by the printing satisfies the printing quality requirement in the determining step to the production system; and
a receiving step of receiving an inspection result of the print product from the production system.

13. A non-transitory computer-readable storage medium for causing a computer to perform:
a receiving step of receiving, via a network from an external apparatus, image data and quality request data;
an interpretation step of interpreting the quality request data received in the receiving step;
a determining step of determining, based on the quality request data interpreted in the interpretation step, a printing quality requirement;
a transmitting step of transmitting an adjustment instruction for performing an adjustment to satisfy the printing quality requirement determined in the determining step to a production system, the adjustment being performed prior to printing based on the image data;
a transmitting step of transmitting the image data to the production system;
a transmitting step of transmitting, based on an interpretation result in the interpretation step, a print setting for executing the printing based on the image data to the production system;
a transmitting step of transmitting, based on the printing quality requirement determined in the determining step, an inspection setting for inspecting whether a print product output by the printing satisfies the printing quality requirement determined in the determining step to the production system; and
a receiving step of receiving an inspection result of the print product from the production system.

* * * * *